US010826362B2

(12) United States Patent
Hasuo

(10) Patent No.: US 10,826,362 B2
(45) Date of Patent: Nov. 3, 2020

(54) LAMINATED IRON CORE AND METHOD FOR MANUFACTURING SAME

(71) Applicant: MITSUI HIGH-TEC, INC., Fukuoka (JP)

(72) Inventor: Yusuke Hasuo, Fukuoka (JP)

(73) Assignee: MITSUI HIGH-TEC, INC., Fukuoka (JP)

(*) Notice: Subject to any disclaimer, the term of this patent is extended or adjusted under 35 U.S.C. 154(b) by 0 days.

(21) Appl. No.: 16/096,739

(22) PCT Filed: Apr. 28, 2017

(86) PCT No.: PCT/JP2017/017036
§ 371 (c)(1),
(2) Date: Oct. 26, 2018

(87) PCT Pub. No.: WO2017/188447
PCT Pub. Date: Nov. 2, 2017

(65) Prior Publication Data
US 2019/0109522 A1 Apr. 11, 2019

(30) Foreign Application Priority Data

Apr. 28, 2016 (JP) ................. 2016-091395

(51) Int. Cl.
H02K 1/06 (2006.01)
H02K 15/02 (2006.01)
(Continued)

(52) U.S. Cl.
CPC ........... H02K 15/022 (2013.01); H02K 1/146 (2013.01); H02K 1/18 (2013.01); H02K 1/24 (2013.01);
(Continued)

(58) Field of Classification Search
CPC .. H02K 1/00; H02K 1/06; H02K 1/12; H02K 1/14; H02K 1/146; H02K 1/148;
(Continued)

(56) References Cited

U.S. PATENT DOCUMENTS

2004/0124734 A1* 7/2004 Liao ................. H02K 1/148
310/254.1
2016/0329783 A1 11/2016 Nagai et al.
2018/0358871 A1 12/2018 Hasuo et al.

FOREIGN PATENT DOCUMENTS

CN 102132366 7/2011
CN 107112824 8/2017
(Continued)

OTHER PUBLICATIONS

International Search Report issued in PCT/JP2017/017036, dated Aug. 1, 2017 and English translation thereof.
(Continued)

Primary Examiner — Tran N Nguyen
(74) Attorney, Agent, or Firm — Greenblum & Bernstein, P.L.C.

(57) ABSTRACT

In a laminated iron core formed by laminating a plurality of iron core pieces, at least one of an inner circumferential portion or an outer circumferential portion of the iron core piece is provided with a connection recess part which is connected with a connection part of a caulking piece detachable in a radial direction from the connection recess part, an outer circumferential edge of the connection part has the same shape as an inner circumferential edge of the connection recess part, and a bottom portion of the connection recess part is not configured by a single straight line.

10 Claims, 16 Drawing Sheets

(51) Int. Cl.
*H02K 1/18* (2006.01)
*H02K 1/14* (2006.01)
*H02K 1/24* (2006.01)

(52) U.S. Cl.
CPC ......... *H02K 15/02* (2013.01); *H02K 2201/09* (2013.01)

(58) Field of Classification Search
CPC ............ H02K 1/16; H02K 1/18; H02K 15/00; H02K 15/02; H02K 15/022; H02K 15/024; H02K 15/12; H02K 15/22
See application file for complete search history.

(56) References Cited

FOREIGN PATENT DOCUMENTS

| JP | 55-162349 U1 | 11/1980 |
|---|---|---|
| JP | 2007-295668 A | 11/2007 |
| JP | 2007-336608 A | 12/2007 |
| JP | 2011-223844 | 11/2011 |
| JP | 5357187 B | 9/2013 |
| JP | 2015-149884 A | 8/2015 |
| WO | 2010/082465 | 7/2010 |

OTHER PUBLICATIONS

Written Opinion issued in PCT/JP2017/017036, dated Aug. 1, 2017 and English translation thereof.

Office Action issued in China Counterpart Patent Appl. No. 201780026597.9, dated Dec. 10, 2019, along with an English translation thereof.

Official Communication issued in European Patent Office (EPO) Patent Application No. 17789728.7, dated Nov. 12, 2019.

* cited by examiner

LAMINATED IRON CORE AND METHOD FOR MANUFACTURING SAME

TECHNICAL FIELD

The present invention relates to a laminated iron core and a method for manufacturing same.

BACKGROUND ART

In manufacturing a laminated iron core (motor core), it is common that iron core pieces adjacent in a lamination direction are mutually fastened by using caulking in terms of costs or ease of manufacturing. However, in a case where a priority is given to a torque or efficiency or the like of a motor, a method is employed in which the iron core pieces adjacent in the lamination direction are mutually coupled by an adhesive or a resin so that a caulking shape does not remain in the laminated iron core (see Patent Literatures 1 and 2). For example, in Patent Literature 2, as illustrated in FIG. 16, a method is disclosed in which a butterfly-shaped caulking piece (scrap part) 121 is provided in the outer circumferential portion of each iron core piece (core part) 120, the iron core pieces 120 adjacent in the lamination direction are mutually integrated by a caulking block which is formed by mutually caulking the caulking pieces 121, and then the caulking block is detached from the iron core pieces 120.

CITATION LIST

Patent Literature

Patent Literature 1: JP-A-2007-336608
Patent Literature 2: Japanese Patent No. 5357187

SUMMARY OF INVENTION

Technical Problem

In a butterfly-shaped caulking piece 121, one wing-shaped portion 122 is fitted and fixed in a fitting recess part 123 formed in an iron core piece 120. For this reason, the detachment of the caulking block from the iron core piece 120 is necessarily performed by sliding the caulking block in the lamination direction of the iron core piece 120. Therefore, a detachment mechanism becomes complicated, and time is also required, which causes an increase in the manufacturing cost. In addition, when sliding the caulking block, the contact area with the caulking block is peeled in the sliding direction so that a defect occurs in a product, and the manufacturing cost increases. Particularly, the phenomenon occurs in the iron core piece 120 of the end portion in the lamination direction. The thinner the plate thickness of the iron core piece 120 is, the higher the rate of occurrence becomes. In Patent Literature 2, in order to facilitate the detachment of the caulking block from the iron core piece 120, a plurality of recess parts 124 to 126 for separation are formed in the contact area between the caulking piece 121 and the iron core piece 120. However, in this case, the process of blanking the iron core piece 120 becomes complicated. For example, since the number of processes increases, the size of the die needs to increase, and the manufacturing cost increases.

The present invention is constituted in consideration of the above situation, and an object of the present invention is to provide a laminated iron core which can be economically manufactured with good workability even using an iron core piece provided with a caulking piece, and a method for manufacturing same.

Solution to Problem

A laminated iron core according to the present invention is a laminated iron core which is made of a rotor iron core or a stator iron core formed by laminating a plurality of iron core pieces, wherein at least one of an inner circumferential portion or an outer circumferential portion of the iron core piece is provided with a connection recess part which is connected with a connection part of a caulking piece detachable in a radial direction from the connection recess part, when viewed in an axial direction of the laminated iron core, an outer circumferential edge of the connection part has the same shape as an inner circumferential edge of the connection recess part, the inner circumferential edge of the connection recess part has a pair of side portions extending in the radial direction and a bottom portion which connects the pair of side portions, and the bottom portion is not configured by a single straight line when viewed in the axial direction of the laminated iron core.

In the laminated iron core, when viewed in the axial direction of the laminated iron core, the bottom portion may be configured by any one of a single circular arc,
a single curved line,
a plurality of straight lines,
a plurality of circular arcs,
a plurality of curved lines, and
a combination thereof.

In the laminated iron core, the pair of side portions of the connection recess part may be wider toward a detachment direction of the caulking piece.

In the laminated iron core, the connection part and the connection recess part may include a cut mark in an axially intermediate portion.

In the laminated iron core, the bottom portion may include a friction part having at least one recess portion or convex portion, at least a part of the friction part may be positioned in an intermediate portion of the bottom portion in a circumferential direction, and the friction parts of the laminated iron core which are laminated in a state where the caulking pieces are detached may be mutually welded.

A method for manufacturing a laminated iron core according to the present invention is a method for manufacturing a laminated iron core in which a plurality of iron core pieces are laminated to form a rotor iron core or a stator iron core, wherein the method including:

a process of providing a connection recess part, which is connected with a connection part of a caulking piece detachable in a radial direction from the connection recess part, in at least one of an inner circumferential portion and an outer circumferential portion of the iron core piece;

a process of laminating the iron core pieces and forming a caulking block by mutually caulking the caulking pieces adjacent in a lamination direction, such that the iron core pieces are connected in the lamination direction;

a process of detaching the caulking block from the iron core pieces in the radial direction; and a process of fixing the laminated iron core pieces by any one or more of a resin, an adhesive and welding, when viewed in an axial direction of the laminated iron core, an outer circumferential edge of the connection part has the same shape as an inner circumferential edge of the connection recess part, the inner circumferential edge of the connection recess part includes a pair of side portions extending in the radial direction and a bottom portion connecting the pair of side portions, and when viewed in the axial direction of the laminated iron core, the bottom portion is not configured by a single straight line.

In the method for manufacturing the laminated iron core, the connection parts of the laminated iron core pieces may be mutually fixed by any one or more of a resin, an adhesive and welding.

In the method for manufacturing the laminated iron core, after the connection part and the connection recess part are formed by a push-back processing, and the caulking piece is separably connected with the iron core piece, the iron core pieces may be laminated, the caulking block may be formed by caulking the caulking pieces adjacent in the lamination direction, and a laminated state of the iron core pieces may be maintained by the caulking block.

In the method for manufacturing the laminated iron core, when viewed in the axial direction of the laminated iron core, the bottom portion may be configured by any one of a single circular arc,
a single curved line,
a plurality of straight lines,
a plurality of circular arcs,
a plurality of curved lines, and
a combination thereof.

In the method for manufacturing the laminated iron core, the pair of side portions of the connection recess part may be wider toward a detachment direction of the caulking block.

In the method for manufacturing the laminated iron core, the bottom portion may include a friction part having at least one recess portion or convex portion, at least a part of friction part may be positioned in an intermediate portion of the bottom portion in a circumferential direction, and the laminated friction parts of the laminated iron core may be mutually welded after the caulking block is detached from the laminated iron core.

In the method for manufacturing the laminated iron core, the process of detaching the caulking block from the iron core pieces in the radial direction may include placing the plurality of iron core pieces in a state of being connected through the caulking block in the lamination direction on a placement table in which a notch is provided right below the caulking block, detaching the caulking block from the iron core pieces in the radial direction, and dropping the detached caulking block to a lower side of the placement table through the notch.

Advantageous Effects of Invention

In the laminated iron core and the method for manufacturing same according to the present invention, the caulking block is detached in the radial direction, and thus the caulking block is detached easily. In addition, unlike Patent Literature 2, it is not necessary to slide the caulking block in an axial direction when detaching the caulking block. Thus, the contact area of the laminated iron core with the caulking block is not peeled, and a defect hardly occurs in a product.

When compared to a case where the contact portion of the bottom portion of the connection recess part is configured by a single straight line, a connection strength between the caulking piece and the iron core piece is improved.

DESCRIPTION OF EMBODIMENTS

Figure 1:
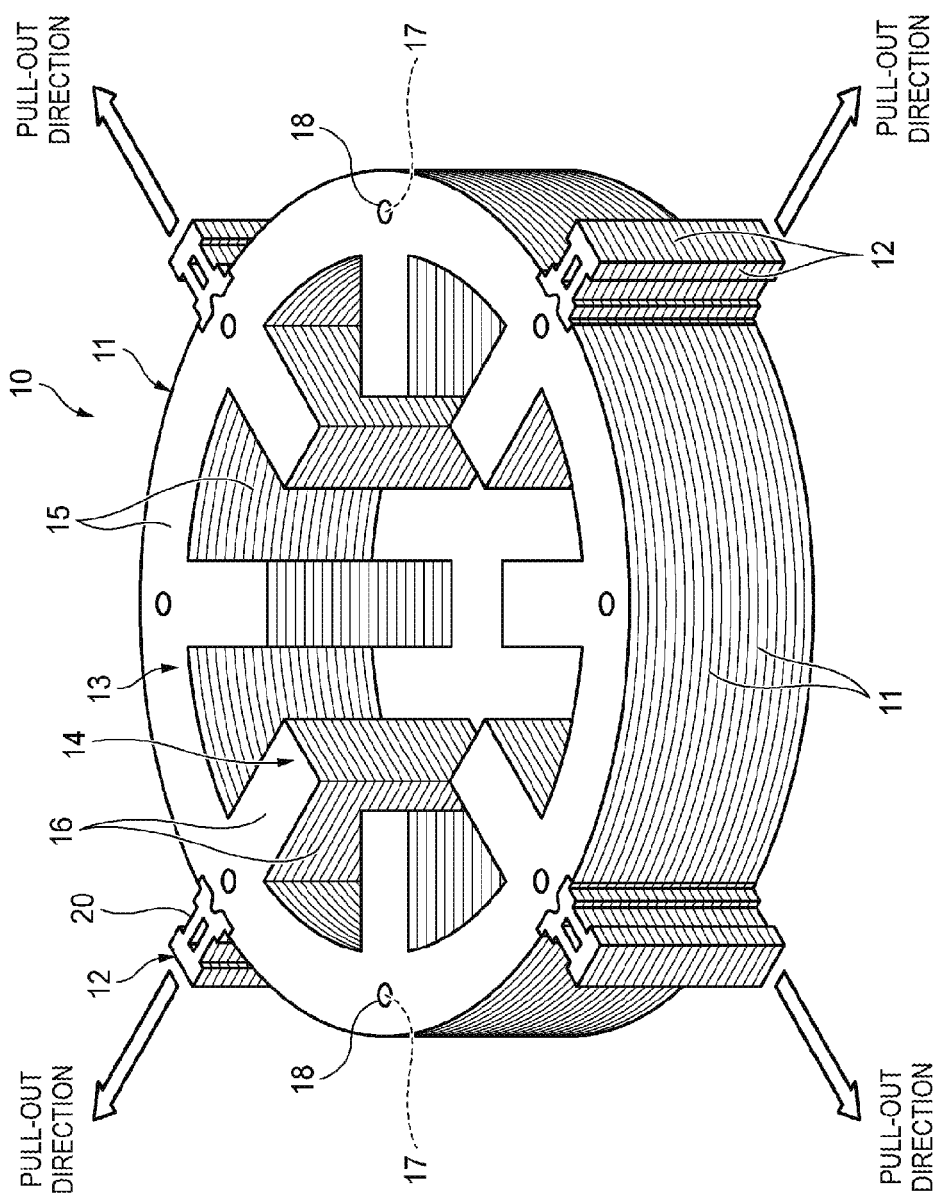
FIG. 1 is a perspective view of a laminated iron core according to a first embodiment of the present invention.

Subsequently, embodiments embodying the present invention will be described with reference to the accompanying drawings such that the present invention is understood. As illustrated in FIG. 1, a laminated iron core 10 according to a first embodiment of the present invention is used as a stator iron core (stator).

The laminated iron core 10 includes an annular yoke part 13 and a plurality of magnetic pole parts 14 formed inside the annular yoke part 13. The yoke part 13 is formed by annular yoke piece parts 15 of a plurality of laminated iron core pieces 11. The magnetic pole parts 14 are formed by magnetic pole piece parts 16 of the plurality of laminated iron core pieces 11.

The iron core piece 11 configuring the laminated iron core 10 is an annular member. The iron core piece 11 may be a structure in which a plurality of circularly-arcuate iron core pieces are connected in an annular shape or may be a structure in which parts of the circumferential portion of the plurality of circularly-arcuate iron core pieces are connected by a connection part, and the connection part may be bent to have an annular shape. The iron core piece 11 is formed by blanking from a strip material which is made of an electromagnetic steel sheet, an amorphous alloy or the like having, for example, a thickness of 0.10 to 0.5 mm. Although the iron core piece 11 is formed by blanking one strip material, the iron core piece may be formed by blanking a plurality (for example, two, or three or more) of stacked strip materials.

The iron core pieces 11 adjacent in the lamination direction are mutually connected by a resin 18 (a thermosetting resin such as an epoxy resin or a thermoplastic resin) filled in through holes 17 which are formed to get through in the lamination direction of the yoke part 13. A plurality of through holes 17 are formed at a constant pitch in the circumferential direction of the laminated iron core 10.

Otherwise, the iron core pieces 11 adjacent in the lamination direction may be mutually connected by the resin filled in connection recess parts 19 (to be described later) formed to be continuous in the lamination direction in the inner circumferential portion or the outer circumferential portion of the laminated iron core 10.

In addition, the iron core pieces 11 can be mutually fixed by using an adhesive or welding other than the above-described resin. Further, any two or more of the resin, the adhesive, and welding can be used in combination.

FIG. 1 illustrates the laminated iron core 10 during manufacturing and illustrates an aspect in which caulking blocks 12 are connected with the laminated iron core pieces 11. In the outer circumferential portion of the yoke piece part 15 of each of the iron core pieces 11, a plurality of (herein, four) caulking blocks 12 are provided at a constant pitch in the circumferential direction. As described later, the caulking blocks 12 are detached from the iron core pieces 11 before the iron core pieces 11 are fixed mutually.

The laminated iron core 10 includes the iron core pieces 11 and the caulking blocks 12. The caulking blocks 12 which are detachable in a radial direction (a direction perpendicular to the lamination direction) are connected with the outer circumferential portions of the plurality of laminated iron core pieces 11. The caulking block 12 is formed by caulking pieces 20 connected with the laminated iron core pieces 11.

As illustrated in FIG. 2(A), the caulking piece 20 includes a caulking processing part 22. The caulking piece 20 may have, for example, a rectangular shape in a plan view. The caulking piece 20 may have a shape of protruding from the iron core piece 11 (yoke piece part 15). Hooking parts 29 for hooking a pull-out jig are provided on both sides of the caulking piece 20 in a width direction (a direction perpendicular to a pull-out direction). When the iron core pieces 11 which include the caulking pieces 20 provided with the hooking parts 29 are laminated, a recess-shaped recess portion is formed on the surface extending in the radial direction of the caulking block 12. The jig can enter the recess portion when the caulking block 12 is pulled out.

As illustrated in FIG. 2(A), the hooking part 29 is preferably provided on an outer diameter side from a final blanking outline 25 of the iron core piece 11. The hooking part 29 is preferably provided in a position separated from the final blanking outline 25 of the iron core piece 11 toward the outer diameter side. The end portion of the hooking part 29 on the inner diameter side is preferably separated on the outer diameter side from the final blanking outline 25.

When the caulking block 12 is detached as described later, the jig is hooked in the hooking part 29, and the caulking block 12 is pulled by the jig. When the hooking part 29 is positioned on the outer diameter side from the final blanking outline 25, the tip of the jig hardly damages the outer circumferential surface of the iron core piece 11 when hooking the jig in the hooking part 29.

Figure 2:
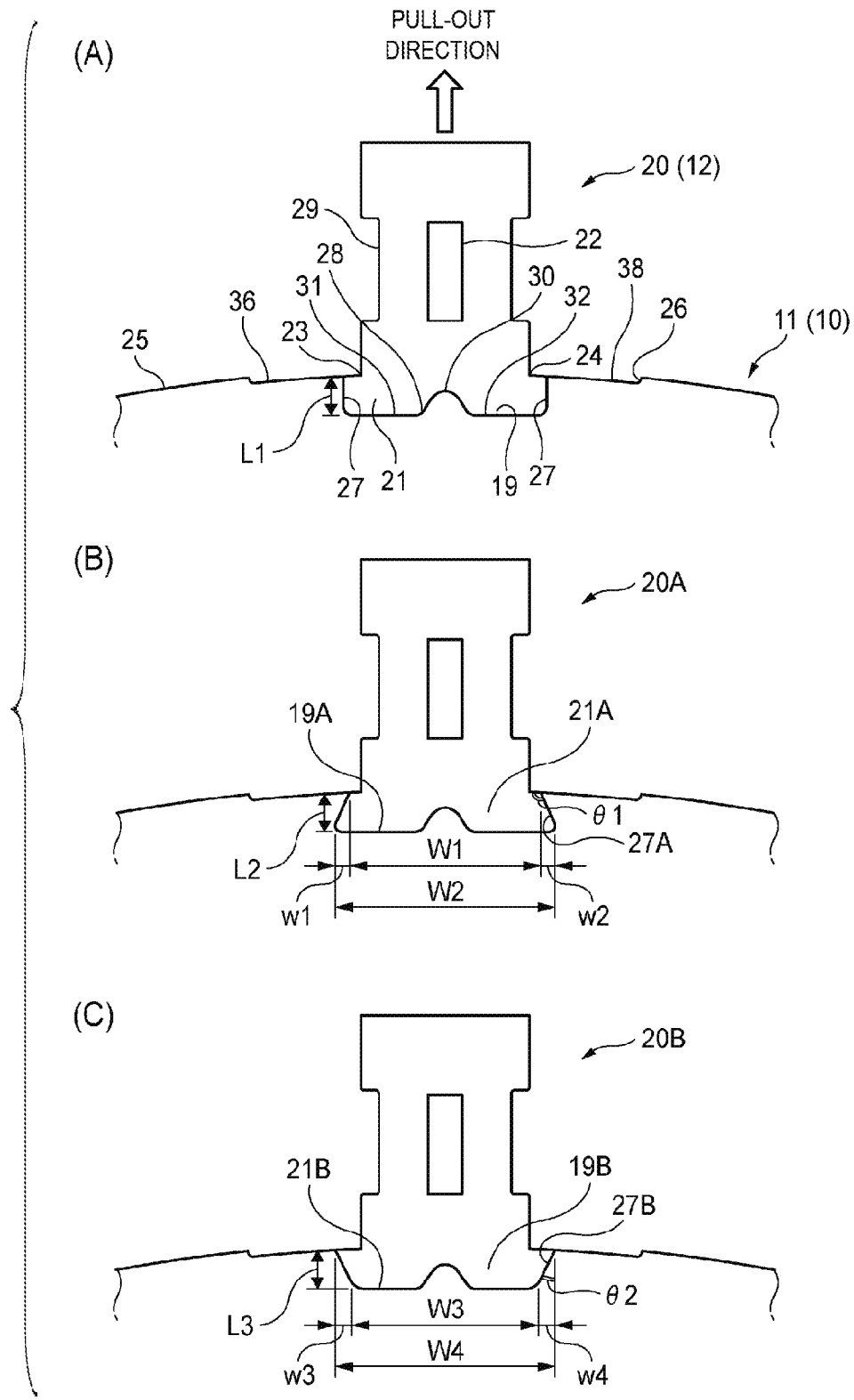
FIG. 2 includes plan views of a caulking piece.

As illustrated in FIG. 2, the hooking parts 29 are provided in a recess shape which is concaved in the circumferential direction on both widthwise sides of the caulking piece 20 which is rectangular in a plan view. That is, the side of the caulking piece 20 extending in the pull-out direction includes a step part which is formed in the central portion in the radial direction to be lower than the inner diameter side and the outer diameter side from the central portion. Since the opening portion can be formed largely in the recess-shaped hooking part 29, the jig easily enters the hooking part 29, and the jig is easily hooked in the hooking part 29.

The caulking processing part 22 which is formed in the almost central portion of the caulking piece 20 can be configured by half-blanking caulking, V caulking, or the like. A caulking protrusion is formed as the caulking processing part 22 in the caulking piece 20 which is provided in the iron core piece 11 other than the iron core piece laminated first. A caulking hole (through hole) in which the caulking protrusion is fitted is formed in the caulking piece 20 which is provided in the iron core piece 11 laminated first. The size of the caulking processing part 22 is not particularly limited as long as the plurality of iron core pieces 11 can be integrated without deviating the relative position between the iron core pieces 11 adjacent in the lamination direction. The size of the caulking processing part can be changed variously depending on the specifications (the outer-shape dimensions of the iron core piece 11, the number of laminations, weight, or the like) of the laminated iron core 10. In the case of V caulking, the caulking processing part can be used in which the size of one side is about 0.5 to 5 mm (for example, 1 mm×4 mm), and the depth of caulking is about 0.5 to 2 times the plate thickness of the iron core piece 11 (for example, one sheet of the iron core piece).

As illustrated in the drawings, the caulking processing part 22 is formed in a substantially rectangular shape. The caulking processing part 22 includes a short side extending in the circumferential direction and a long side extending in the radial direction. In the caulking processing part 22, the long axis thereof extends in the pull-out direction. The caulking processing part 22 is not limited to the rectangular shape and may have a flat shape such as an elliptical shape. Preferably, the caulking processing part 22 has the flat shape having a short axis and a long axis longer than the short axis, and the long axis extends along the pull-out direction.

As illustrated in FIG. 2(A), the connection recess part 19 is provided in at least one of the inner circumferential portion or the outer circumferential portion of the annular iron core piece 11. However, the inner circumferential portion of the iron core piece 11 mentioned herein does not mean only the edge which is positioned on the most inner side in the iron core piece 11. The inner circumferential portion of the iron core piece 11 includes the inner circumferential edge of the yoke part 13 and the inner circumferential edge or a pair of side edges of the magnetic pole part 14. Similarly, the outer circumferential portion of the iron core piece 11 mentioned herein does not mean only the edge which is positioned on the most outer side in the iron core piece 11.

The caulking piece 20 is configured to be detachable from the connection recess part 19 of the iron core piece 11 in the radial direction of the laminated iron core 10. A connection part 21 of the caulking piece 20 is connected with the connection recess part 19 of the iron core piece 11. The connection part 21 is a portion where the caulking piece 20 is positioned in the connection recess part 19 in a state where the caulking piece 20 is connected with the iron core piece 11.

When viewed in the axial direction (the direction perpendicular to the paper surface of FIG. 2) of the laminated iron core 10, the outer circumferential edge (contour) of the connection part 21 has the same shape as the inner circumferential edge (contour) of the connection recess part 19. That is, when viewed in the axial direction of the laminated iron core 10, the connection part 21 has a shape corresponding to the connection recess part 19. The connection part 21 contacts with the connection recess part 19 without a gap.

In the illustrated example, the connection recess part 19 of the iron core piece 11 is open to the outer diameter side. The inner circumferential edge of the connection recess part 19 is configured by a pair of side portions 27 extending in the radial direction and a bottom portion 28 connecting the pair of side portions 27. The bottom portion 28 is not configured by a single straight line when viewed in the axial direction of the laminated iron core 10. In the illustrated example, the bottom portion 28 is configured by two straight lines 31 and 32 and a convex curved line 30 which is provided between the two straight lines 31 and 32 and protrudes in the pull-out direction. The side portion 27 may be configured by a straight line or may be configured by a curved line.

Similarly, the outer circumferential edge of the connection part 21 of the caulking piece 20 includes a pair of side portions extending in the radial direction and a bottom portion connecting the pair of side portions. The bottom portion is not configured by a single straight line when viewed in the axial direction of the laminated iron core 10. In the illustrated example, the bottom portion is configured by two straight lines and a convex curved line which is provided between the two straight lines and protrudes in the pull-out direction.

The connection part 21 of the caulking piece 20 is temporarily fixed in the connection recess part 19 by a push-back processing. Specifically, the connection part 21 is completely separated (cut and bent) once from the yoke piece part 15 of the iron core piece 11 or is half-blanked. The connection part 21 which is separated or half-blanked is pushed back (hit) again to be a planar shape, such that the levels of the connection part 21 and the yoke piece part 15 in the vicinity thereof match. In a case where the connection part 21 is formed by half-blanking, microscopically, a cut mark may be present in the intermediate portion of the connection part 21 in the axial direction (lamination direction) and in the intermediate portion of the connection recess part 19 in the axial direction (lamination direction).

As illustrated in FIG. 2, in the caulking piece 20, the width of the connection part 21 on the base end side (inner diameter side) is larger than the width on the upper end side (outer diameter side) by the amount corresponding to the length of shoulder parts 23 and 24. Outlines 36 and 38 of the iron core piece 11 are continuous (positioned on both sides of the caulking piece 20) to the shoulder parts 23 and 24 of the caulking piece 20, respectively. Although the outlines 36 and 38 are connected with the final blanking outline 25 of the iron core piece 11 to have steps 26, the steps may not be provided. The size of the connection part 21 may be variously changed depending on the specifications (the outer-shape dimensions of the iron core piece, the number of laminations, weight, and the like) of the laminated iron core 10. For example, a depth L1 of the connection recess part 19 in the radial direction is about 0.5 to 2 mm (further, an upper limit may be 1.5 mm).

The shoulder parts 23 and 24 are portions where the side of the caulking piece 20 extending in the radial direction is connected with the final blanking outline 25 of the iron core piece 11. The shoulder parts 23 and 24 are configured by the side extending in the radial direction and the side extending in the circumferential direction of the iron core piece 11. Also, when the plurality of iron core pieces 11 are laminated, the shoulder parts 23 and 24 include the surface extending in the radial direction and the surface extending in the circumferential direction.

In the laminated iron core 10 according to this embodiment, the caulking block 12 which is formed by caulking the caulking piece 20 adjacent in the lamination direction is detachable in the radial direction of the laminated iron core 10. Unlike the laminated iron core disclosed in Patent Literature 2, the caulking block 12 is not moved in the lamination direction during the detachment of the caulking block 12, and, thus, the vicinity of the connection part 21 is not peeled. Accordingly, it is unnecessary to perform the blanking process for preventing the peeling, and it is possible to prevent the defect in a product caused by the peeling.

In the laminated iron core 10 according to this embodiment, when compared to a case where the bottom portion 28 of the connection recess part 19 is configured by a single straight line, the contact area between the caulking piece 20 and the iron core piece 11 can be secured largely, and, thus, the connection strength between the caulking piece 20 and the iron core piece 11 is improved. The connection state between the caulking piece 20 and the iron core piece 11 is easily maintained, thereby facilitating the handling of the caulking piece 20 and the iron core piece 11 during the manufacturing.

The caulking piece 20 may be configured as illustrated in FIG. 2(B) or 2(C) as long as the caulking piece is detachable in the radial direction.

A connection part 21A of a caulking piece 20A illustrated in FIG. 2(B) has a shape of narrowing in the pull-out direction. A length L2 of the connection part 21A in a radial direction is 0.5 to 2 mm. Preferably, a lower side W2 of the connection part 21A is in a range of exceeding 0 and 0.2 mm or less than an upper side W1. More preferably, the lower side W2 is in a range of exceeding 0 and 0.15 mm or less than the upper side W1, for example, about 0.10 mm. Incidentally, in the illustrated example, protrusion widths w1 and w2 of the lower side W2 with respect to the upper side W1 are the same. The protrusion widths w1 and w2 can be 0.1 mm or less. Preferably, the protrusion width is 0.075 mm or less, for example, 0.05 mm.

At that time, an inclination angle θ1 of the side portion 27A with respect to the radial direction may be set to be $\tan^{-1}(0.1)$ or less (exceeding 0° and 5.8° or less, preferably 4.3° or less, for example, 2.9°).

A connection part 21B of a caulking piece 20B illustrated in FIG. 2(C) has a shape of widening in the pull-out direction. A length L3 of the connection part 21B in the radial direction is 0.5 to 2 mm. A lower side W4 of the connection part 21B is smaller than an upper side W3 in a range of exceeding 0 and 4 mm or less (preferably, 3 mm or less). In the illustrated example, protrusion widths w3 and w4 of the upper side W3 with respect to the lower side W4 protruding on both sides of the connection part 21B are the same (w3 and w4 are 2 mm or less, preferably, 1.5 mm or less). At that time, the inclination angle θ2 of the side portion 27B with respect to the radial direction may be $\tan^{-1}(2)$ or less (exceeding 0° and 64° or less, preferably 56° or less).

As described above, preferably, the pair of side portions 27B of the connection recess part 19B are wider toward a detachment direction (in the illustrated example, the outside in the radial direction) of the caulking block 12. The detachment of the caulking block 12 is facilitated.

The above-described lengths L1 to L3 of the connection parts 21, 21A, and 21B in the radial direction, the protrusion widths (w1 and w2) of the lower side W2 with respect to the upper side W1 of each of the connection parts 21, 21A, and 21B, and the protrusion widths (w3 and w4) of the upper side W3 with respect to the lower side W4 of each of the connection parts 21, 21A, and 21B are set based on the result which is obtained through various tests in which an examination is made on the connection strength between the caulking block 12 and the laminated iron core pieces 11 and the ease of the detachment between the caulking block 12 and the laminated iron core pieces 11.

The shape of the caulking piece 20 is not limited particularly.

For example, in FIG. 2(A), the hooking part 29 is illustrated which is formed as a substantially rectangular valley portion. However, the hooking part 29C may be provided which is formed as a V-shaped valley portion as illustrated in FIG. 3(A).

Figure 3:
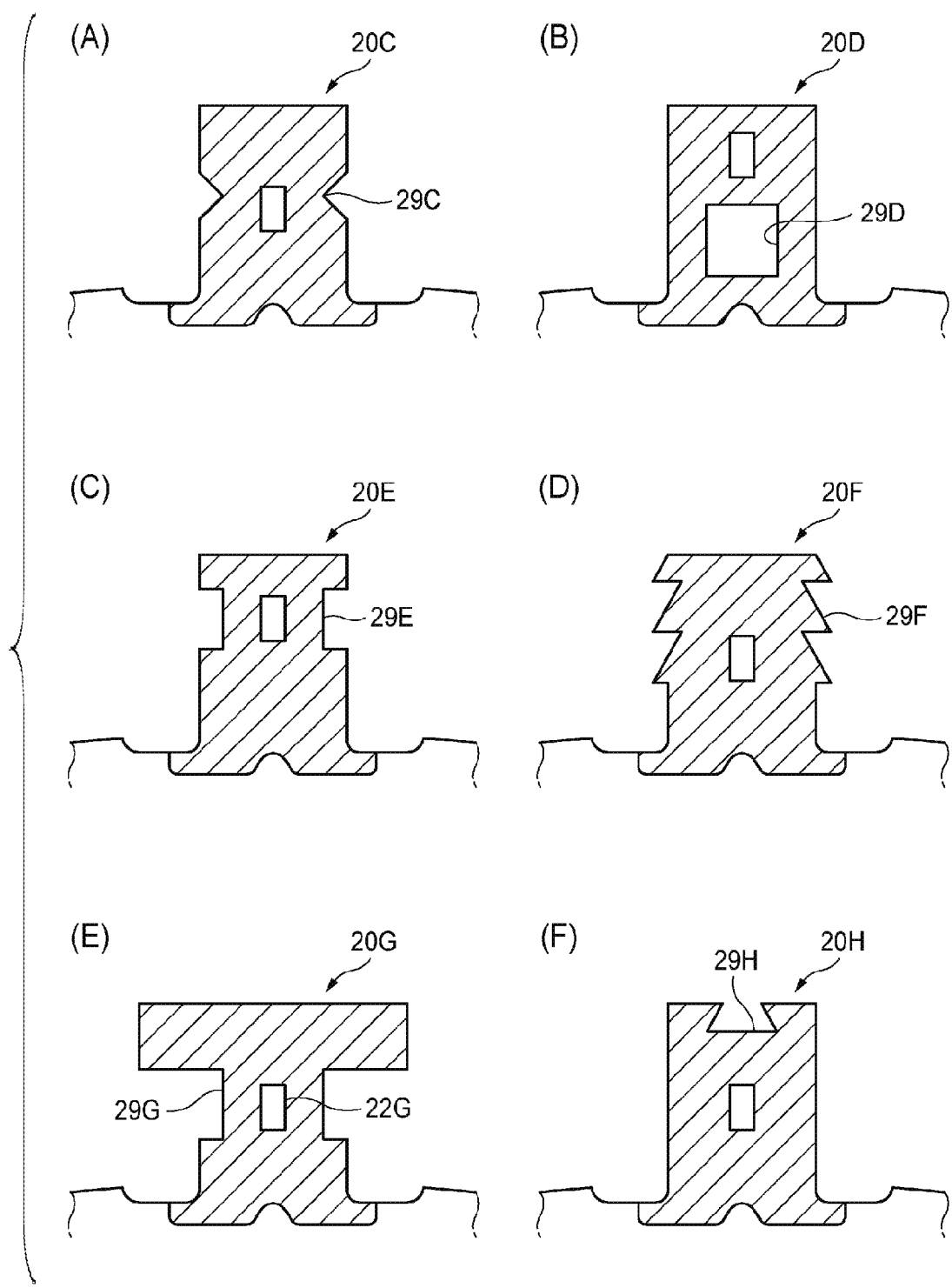
FIG. 3 includes plan views of a caulking piece according to a modified example.

Otherwise, as illustrated in FIG. 3(B), a hole 29D may be formed as the hooking part in the central portion of the caulking piece 20D. When the side of the hole 29D is held by the jig, the caulking piece 20 can be deformed to hook the jig.

In FIG. 2(A), the caulking processing part 22 and the hooking part 29 are provided in the intermediate portion in the radial direction. However, the hooking part 29E may be provided in the outer portion in the radial direction as illustrated in FIG. 3(C). Otherwise, the hooking part may be provided in the inner portion in the radial direction.

As illustrated in FIG. 3(D), a multistep-shaped hooking part 29F may be provided along the pull-out direction. The pull-out force by the jig can be reliably transferred to the caulking piece 20.

As illustrated in FIG. 3(E), a caulking piece 20G may be formed in a T shape in a plan view. In addition, the hooking part 29G may be provided to have a larger dimension in the radial direction than a caulking processing part 22G.

As illustrated in FIG. 3(F), a hooking part 29H having an isosceles trapezoidal shape with a narrow width in the pull-out direction may be provided in the tip portion of a caulking piece 20H in the pull-out direction.

Figure 4:
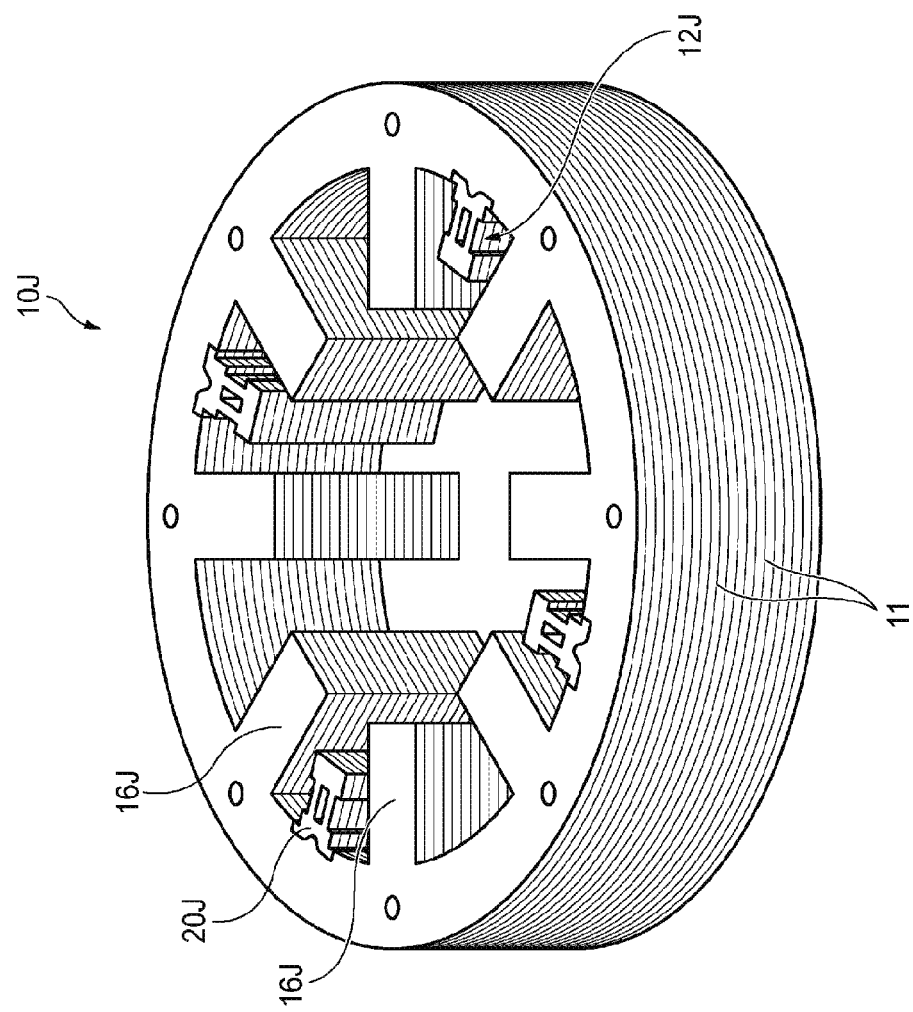
FIG. 4 is a perspective view of a laminated iron core according to a second embodiment of the present invention.

In the embodiment illustrated in FIG. 2(A), the example in which the caulking piece 20 is provided in the outer circumferential portion of the annular iron core piece 11 is described. However, a caulking piece 20J may be provided in the inner circumferential portion of an annular iron core piece 11J as illustrated in FIG. 4. In this case, the caulking piece 20J can be provided between magnetic pole piece parts 16J adjacent in the circumferential direction of the iron core piece 11J. The plurality of (herein, four) caulking pieces 20J can be provided at a constant pitch in the circumferential direction. In this case, the pull-out direction of a caulking block 12J formed by the laminated caulking pieces 20J is set to be the inner diameter side of the laminated iron core 10J. In addition, the caulking piece 20J may be provided in both the inner circumferential portion and the outer circumferential portion of the iron core piece 11J.

Figure 5:
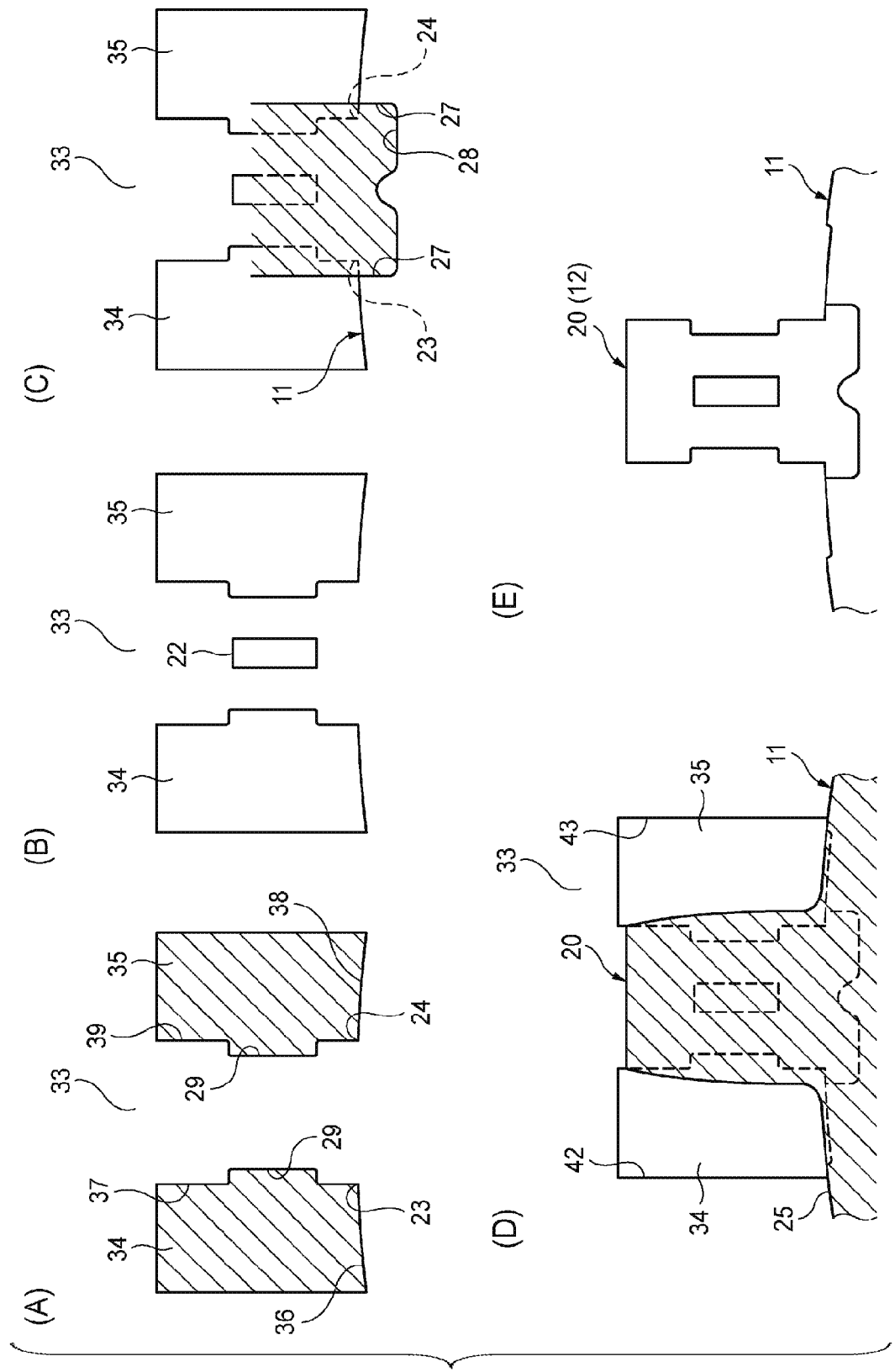
FIG. 5 includes diagrams for explaining a method for manufacturing the laminated iron core according to the first embodiment of the present invention.

Subsequently, a method for manufacturing the laminated iron core according to the first embodiment of the present invention will be described by using FIG. 5. In a following plan view, a hatched area indicates the area where a cutter (punch, die) contacts.

According to the order of FIG. 5(A) to (E), the plurality of iron core pieces 11 are blanked by using the die (not illustrated) from the strip material 33 which is made of the electromagnetic steel sheet having a thickness of 0.10 to 0.5 mm. The iron core piece 11 is blanked from one strip material 33. However, the plurality of iron core pieces 11 may be blanked at the same time in a state where a plurality of (for example, two or three or more) strip materials are stacked. In the caulking block which is slid in the axial direction during the detachment in Patent Literature 2, the rate of occurrence of being peeled in the sliding direction is increased as the thickness of the iron core piece is thinner. Herein, when the thickness of the strip material 33 is 0.2 mm or less, the effect of the present invention becomes more prominent.

First, as illustrated in FIG. 5(A), a first side area 34 and a second side area 35 are blanked in the outer circumferential portion of the iron core piece 11 intended to be blanked from the strip material 33. The first side area 34 includes one outline 36 of the iron core piece 11 illustrated in FIG. 2(A) and forms one lateral side 37 and the shoulder part 23 of the caulking piece 20. The second side area 35 includes the other outline 38 of the iron core piece 11 illustrated in FIG. 2(A) and forms the other lateral side 39 and the shoulder part 24 of the caulking piece 20 (hereinbefore, a first process). Preferably, the hooking part 29 is formed when forming the first side area 34 and the second side area 35.

Next, as illustrated in FIG. 5(B), the caulking processing part 22 formed by half-blanking caulking, V caulking, or the like is formed in the intermediate position between the first side area 34 and the second side area 35 of the strip material 33. The caulking protrusion is formed in the caulking piece 20 provided in the iron core piece 11 other than the iron core piece laminated first. The caulking hole (through hole) where the caulking protrusion is fitted is formed in the caulking piece 20 which is provided in the iron core piece 11 laminated first (hereinbefore, a second process). The order of the first process and the second process may be changed. Preferably, the caulking processing part 22 has the flat shape which has a short axis and a long axis longer than the short axis, and the long axis is formed to extend along the pull-out direction.

Next, as illustrated in FIG. 5(C), the connection part 21 of the caulking piece 20 and the connection recess part 19 of the iron core piece 11 are formed from the strip material 33 by the above-described push-back processing, and the caulking piece 20 is separably connected with the iron core piece 11. When viewed in the axial direction of the laminated iron core 10, the outer circumferential edge of the connection part 21 is processed to have the same shape as the inner circumferential edge of the connection recess part 19. The inner circumferential edge of the connection recess part 19 is processed to have the pair of side portions 27 extending in the radial direction and the bottom portion 28 connecting the pair of side portions 27. When viewed in the axial direction of the laminated iron core 10, the bottom portion 28 is processed not to be configured by a single straight line. In the illustrated example, the contour of the bottom portion 28 is configured by two straight lines and one convex curved line interposed between the two straight lines.

As illustrated in FIG. 5(C), preferably, a width dimension of a punch is larger than the width between the sides of the shoulder parts 23 and 24 extending in the radial direction. Accordingly, the shoulder parts 23 and 24 are formed, and the caulking block 12 can be reliably separated from the iron core piece 11 in a fifth process which is to be described later.

Herein, it is possible to adjust the fitting strength between the connection recess part 19 of the iron core piece 11 and the connection part 21. As the adjusting method, for example, a method is provided which adjusts the protrusion amount of both sides of the connection part 21 toward the connection part 21 side by a kind, a size, a depth, a direction, and a formation position of the caulking block 12, a radial length of the connection part 21, an inclination angle of the side portion of the connection part 21, or the like. In addition, a method is also provided which increases the protrusion amount of the connection part 21 toward the iron core piece 11 side by hitting the connection part 21 (hereinbefore, a third process).

Next, as illustrated in FIG. 5(D), the iron core piece 11 where the caulking piece 20 is connected is blanked from the strip material 33 to obtain the iron core piece 11 where the caulking piece 20 is connected as illustrated in FIG. 5(E). The iron core piece 11 is blanked so that the final blanking outline 25 of the iron core piece 11 illustrated in FIG. 2(A) intersects with blanking lines 42 and 43 on both widthwise sides of the first side area 34 and the second side area 35.

Further, the plurality of iron core pieces 11 where the caulking pieces 20 are connected are laminated, and the caulking block 12 is formed by mutually caulking the caulking pieces 20 adjacent in the lamination direction. Thus, the plurality of laminated iron core pieces 11 become in the state of being connected by the caulking block 12 mutually caulked in the lamination direction (hereinbefore, a fourth process).

Figure 6:
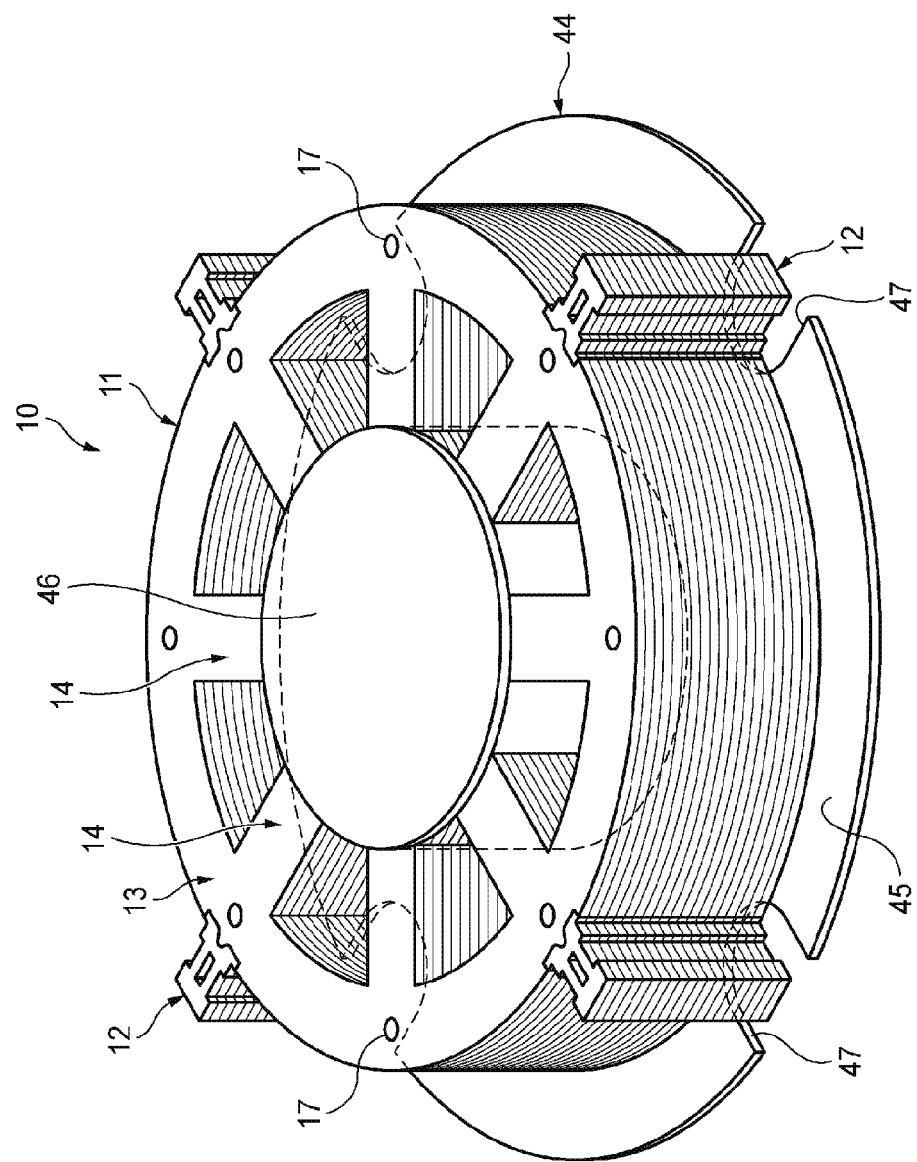
FIG. 6 is a perspective view illustrating a state where laminated iron core pieces are placed on a conveyance jig in the method for manufacturing the laminated iron core according to the first embodiment of the present invention.
Figure 7:
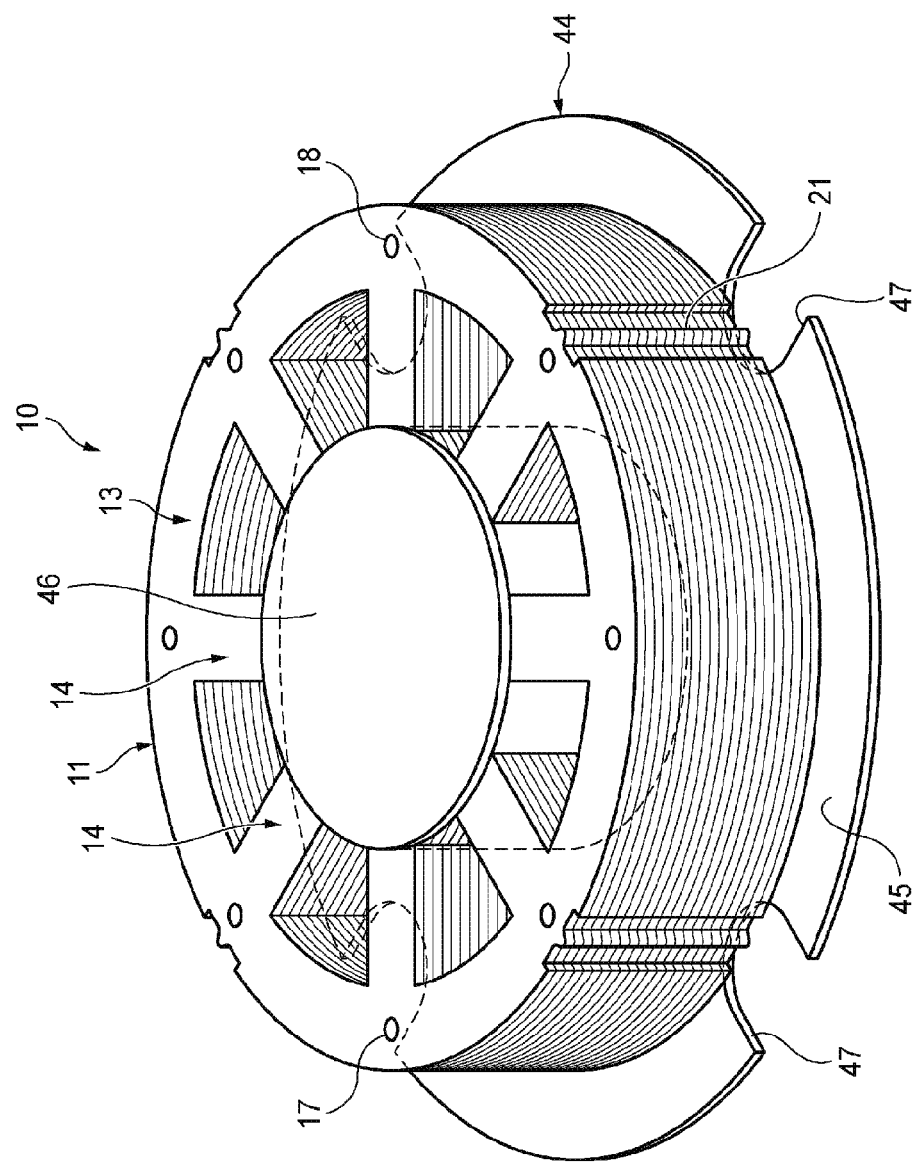
FIG. 7 is a perspective view illustrating a state where the caulking block is detached from the iron core piece in the method for manufacturing the laminated iron core according to the first embodiment of the present invention.

Next, as illustrated in FIG. 6, the plurality of iron core pieces 11 connected by the caulking blocks 12 are placed on a conveyance jig (one example of the jig) 44. The conveyance jig 44 includes a substantially circular placement table 45 and a core member (guide member) 46 provided in the center of the placement table. In the core member 46, the upper end portion is chamfered, but the other portion has a circular cross section (may have a polygonal cross section) and contacts the inner end portion of the magnetic pole part 14. Accordingly, the axial center of the iron core piece 11 can be positioned as illustrated in FIGS. 6 and 7. When the iron core pieces 11 are conveyed, a state that the iron core pieces 11 are laminated is maintained by the caulking block 12, thereby facilitating the handling.

A plurality of positioning members which stop the rotation of the laminated iron core 10 with respect to the placement table 45 may be provided on the placement table 45. The positioning member is provided between the adjacent magnetic pole parts 14 and contacts the magnetic pole part 14. The positioning member may be used instead of the above-described core member 46, and may be used in combination with the core member 46.

A notch 47 may be is provided right below the caulking block 12 in the outer circumferential portion of the placement table 45. The notch 47 can be used when the plurality of laminated iron core pieces 11 are mutually fixed after the caulking blocks 12 are detached. In the above-described conveyance jig 44, the laminated iron core pieces 11 are positioned with reference to an inner diameter by using the core member 46. However, the laminated iron core pieces 11 can be also positioned with reference to an outer diameter by using the positioning member which contacts the outer circumferential surface of the yoke part 13.

As illustrated in the drawings, the placement table 45 includes the notch 47 which is positioned right below the caulking block 12. The placement table 45 is a substantially disc-shaped member. The placement table 45 includes the plurality of notches 47 extending in the radial direction. The notch 47 is formed to be notched outward from the inner area of the outer circumferential edge of the laminated iron core 10 in the placement table 45. That is, the inner end portion of the notch 47 is positioned on the inner side of the outer circumferential edge of the laminated iron core 10 in the radial direction.

In the illustrated example, the number of the notches 47 is the same as the number of the caulking blocks 12 provided in the single laminated iron core 10. The notches 47 are provided at equal intervals in the circumferential direction. Incidentally, the number of the notches 47 may be more than the number of the caulking blocks 12 provided in the single laminated iron core 10.

As described above, since the placement table 45 includes the notches 47 positioned right below the caulking blocks 12, a following processing can be performed in a process of detaching the caulking blocks from the iron core pieces in the radial direction.

First, the plurality of iron core pieces 11 in the state of being connected through the caulking blocks 12 in the lamination direction are placed on the placement table 45 provided with the notches 47 right below the caulking blocks 12. Next, the caulking blocks 12 are detached from the iron core pieces 11 in the radial direction. Further, the detached caulking blocks 12 are dropped to the lower side of the placement table 45 through the notches 47.

That is, the caulking blocks 12 detached in the radial direction can be dropped down without change to the lower side of the placement table 45 by using the notches 47. Accordingly, the iron core pieces 11 to be processed next is easily placed on the placement table 45 without piling the caulking blocks 12 detached in the placement table 45.

Subsequently, as illustrated in FIG. 7, the caulking blocks 12 are detached from the iron core pieces 11 in the radial direction of the laminated iron core 10. While the caulking blocks 12 are detached from the iron core pieces 11 in the radial direction, a force in the radial direction acts on the caulking blocks 12, a force in the circumferential direction acts thereon, or a force including the component in the radial direction and the component in the circumferential direction acts thereon. Accordingly, the iron core pieces 11 restrained by the caulking blocks 12 are released, and the iron core pieces 11 are aligned along the core member 46 (hereinbefore, the fifth process).

The through holes 17 are filled with the resin 18 to fix (fixing-process) the plurality of iron core pieces 11. Herein, the resin sealing (resin bonding) of the laminated iron core 10 can be performed in such a manner that the laminated iron core 10 is conveyed, for example, between the upper die and the lower die in a state that the laminated iron core 10 is placed on the conveyance jig 44, the laminated iron core 10 is pinched, and then the through holes 17 are filled with the resin 18. An adhesive or welding other than the above-described resin also can be used to mutually fix the iron core pieces 11. Further, any two or more of the resin, the adhesive, and welding can be used in combination (hereinbefore, a sixth process). In addition, the iron core pieces 11 may be fixed mutually by coating the connection recess parts 19 continuous in the lamination direction with the resin or the adhesive or by welding as well as by filling the through hole 17 with the resin 18.

In the method for manufacturing the laminated iron core 10 according to this embodiment, the caulking block 12 formed by caulking the caulking pieces 20 adjacent in the lamination direction is detachable in the radial direction of the laminated iron core 10. Unlike the laminated iron core disclosed in Patent Literature 2, the caulking block 12 is not moved in the lamination direction during the detachment of the caulking block 12, and, thus, the vicinity of the connection part 21 is not peeled. Therefore, it is unnecessary to perform the blanking process for preventing the peeling, and it is possible to prevent the defect in a product caused by the peeling.

In the method for manufacturing the laminated iron core 10 according to this embodiment, when compared to a case where the bottom portion 28 of the connection recess part 19 is configured by a single straight line, the contact area between the caulking piece 20 and the iron core piece 11 can be secured largely. Thus, the connection strength between the caulking piece 20 and the iron core piece 11 is improved. The connection state between the caulking piece 20 and the iron core piece 11 is easily maintained, thereby facilitating the handling of the caulking piece 20 and the iron core piece 11 during the manufacturing, for example, during placement on the conveyance jig 44.

The contact area between the iron core piece 11 and the resin or the adhesive which mutually fixes the laminated iron core pieces 11 can be secured largely, and the iron core pieces 11 are firmly fixed to each other. Therefore, when the laminated iron core pieces 11 are fixed mutually, the fixing may be performed by all the connection recess parts 19.

In a case where the connection part 21 and the connection recess part 19 are formed by the push-back processing as in this embodiment, a burr hardly occurs.

If a burr is present when the iron core pieces 11 are fixed by the adhesive or the resin, the adhesive or the resin adheres to the burr. Thus, the place to be coated originally is hardly coated with the adhesive or the resin, or the coating amount becomes insufficient. However, according to this embodiment, the burr hardly occurs due to the push-back processing, thus, the place to be coated originally is coated easily, and the iron core pieces 11 can be fixed excellently by the resin or the adhesive.

Otherwise, if the burr is present when the iron core pieces 11 are fixed by the welding, the burr is welded prior to the place to be welded originally, and the place to be welded originally cannot be welded successfully. However, according to this embodiment, the burr hardly occurs due to the push-back processing, and, therefore, a defect in the welding can be reduced.

As in this embodiment, preferably, the bottom portion 28 of the connection recess part 19 has a friction part having at least one recess portion or convex portion. Preferably, at least a part of the friction part is positioned in the intermediate portion of the bottom portion 28 in the circumferential direction, and the friction parts of the laminated iron core pieces 1 are welded mutually in a state that the caulking blocks 12 are detached. Preferably, when the bottom portion 28 is divided into three equal portions of a right portion, an intermediate portion, and a left portion in the circumferential direction, at least a part of the friction part is positioned in the central portion.

When the friction parts of the iron core piece 11 are mutually connected by the welding, a thermal strain may occur in the welded friction part so that the friction part interrupts a magnetic path in the laminated iron core 10 which becomes a product. However, according to this embodiment, at least a part of the friction part is positioned in the intermediate portion of the bottom portion 28 where the magnetic path is hardly interrupted, and, thus, the magnetic characteristic of the laminated iron core 10 is hardly reduced.

Next, a method for manufacturing a laminated iron core according to a second embodiment of the present invention is described. In this embodiment, provided is a method for manufacturing a laminated iron core which is made of a rotor iron core (rotor).

Figure 8:
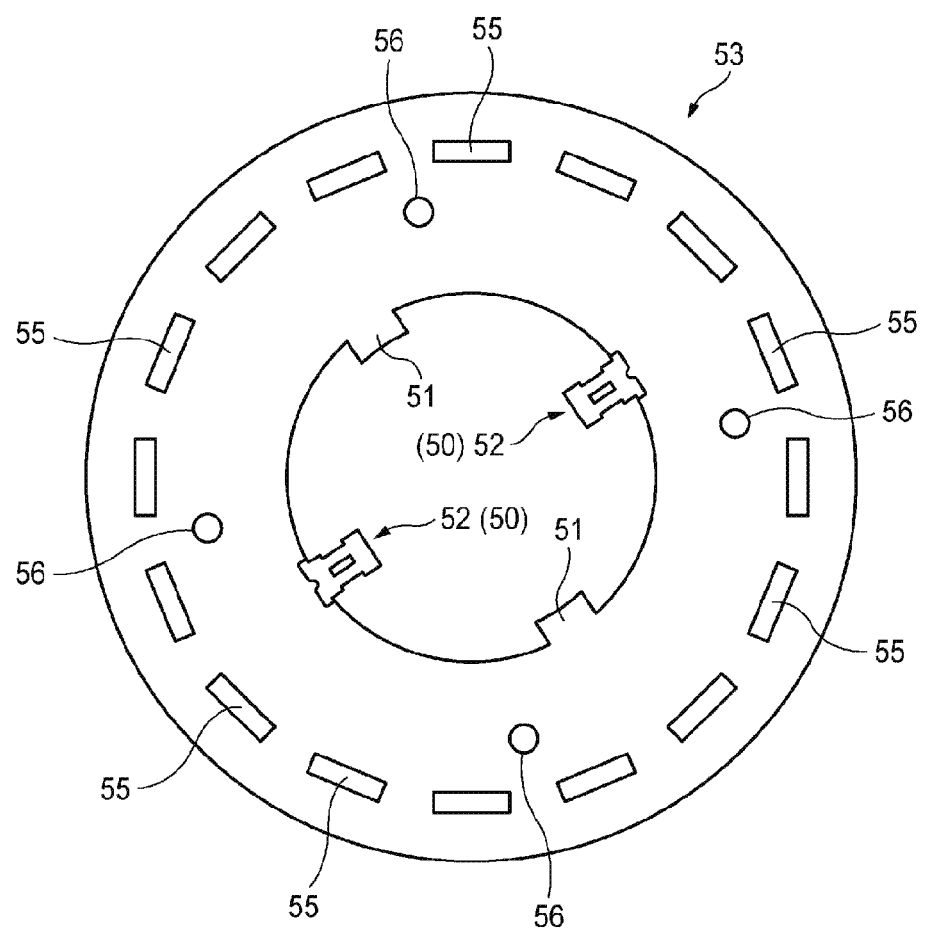
FIG. 8 is a plan view of an iron core piece which is used in a method for manufacturing the laminated iron core according to the second embodiment of the present invention.

As illustrated in FIG. 8, a key piece part 51 and a caulking piece 52 are provided in an inner circumferential edge of an annular iron core piece 53. After the plurality of iron core pieces 53 are laminated, the caulking block 50 is formed by mutually caulking the caulking pieces 52 adjacent in the lamination direction, and the laminated state of the plurality of iron core pieces 53 is maintained. The caulking blocks 50 are detached from the laminated iron core pieces 53 connected by the caulking blocks 50, and the laminated iron core pieces 53 are fixed mutually.

The iron core pieces 53 illustrated in FIG. 8 are manufactured by the manufacturing processes illustrated in FIG. 9(A) to (D).

Figure 9:
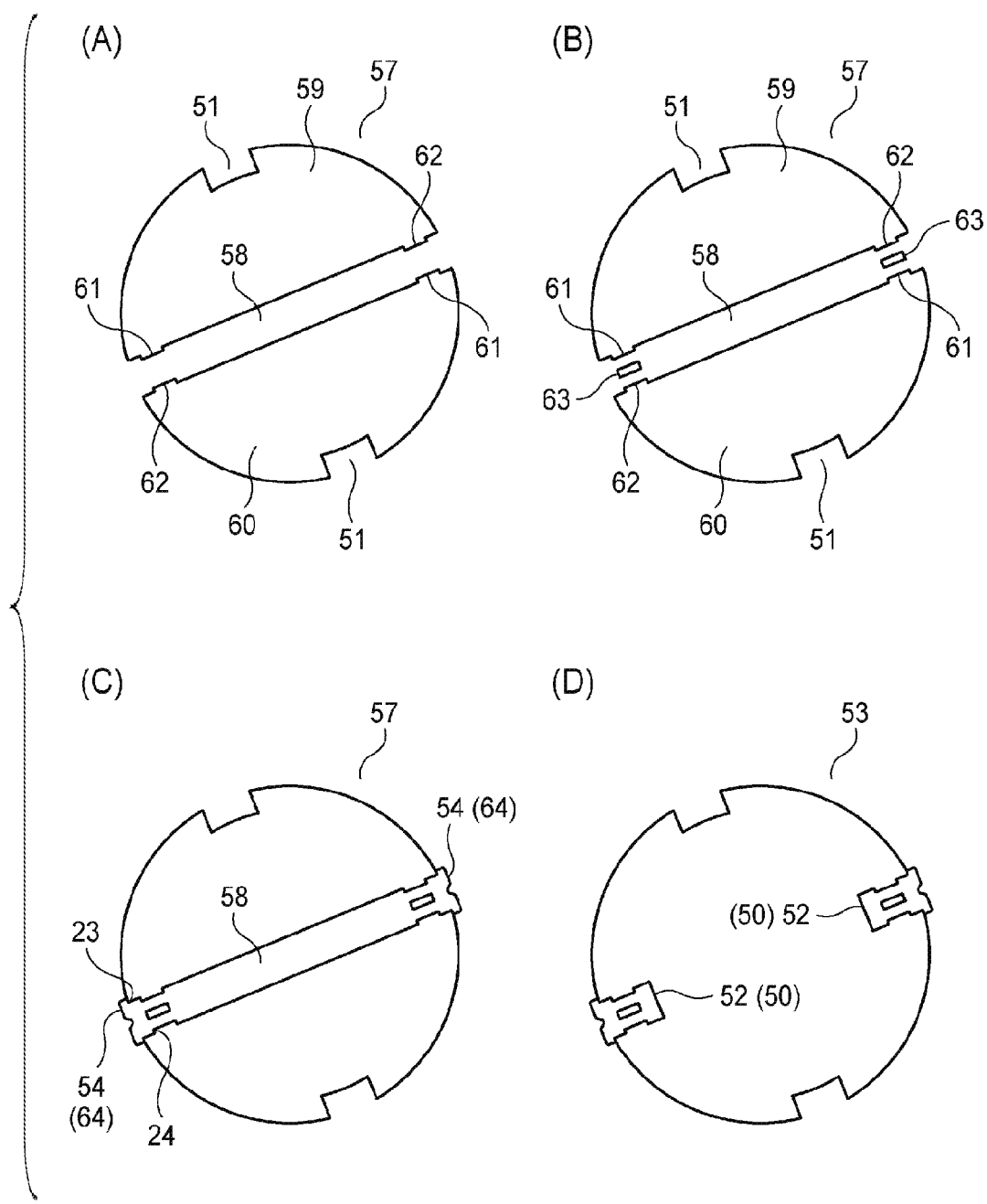
FIG. 9 includes diagrams for explaining a manufacturing process of the iron core piece in the method for manufacturing the laminated iron core according to the second embodiment of the present invention.

In the first process illustrated in FIG. 9(A), the strip material 57 is blanked to form a pair of the key piece parts 51 and a bridge piece part 58 which straddles the inner circumferential hole of the iron core piece 53 in an angular position different from the key piece parts 51. By the blanking, lower holes 59 and 60 are formed to have the contour line of the key piece part 51, the contour line of the bridge piece part 58, and the blanking contour line configured by parts of the inner circumferential hole of the iron core piece 53.

When the bridge piece part 58 is blanked from the strip material 57, a first side area 61 and a second side area 62 which form both lateral sides of the caulking piece 52 are also formed. As illustrated in FIG. 9(A), preferably, when the first side area 61 and the second side area 62 are formed, the recess-shaped hooking part is formed. Preferably, when the caulking piece 52 is formed, the recess-shaped hooking part which the jig can enter when pulling out is formed on the side of the caulking piece 52 extending in the radial direction.

In the second process illustrated in FIG. 9(B), a caulking processing part 63 is formed between the first side area 61 and the second side area 62. Herein, the caulking processing part 63 is formed by the half-blanking caulking, the V caulking, or the like. A caulking protrusion is formed as the caulking processing part 63 in the caulking piece 52 which is provided in the iron core piece 53 laminated first. A caulking hole (through hole) where the caulking protrusion is fitted is formed in the caulking piece 52 provided in the iron core piece 53 laminated first.

The order of the first process and the second process described above may be changed. Further, the caulking processing part 63 may be formed in the third process of FIG. 9(C). That is, the caulking processing part 63 can be formed in any processes before the outer shape of the iron core piece 53 is blanked. As illustrated in the drawings, preferably, the caulking processing part 63 has a flat shape having a short axis and a long axis longer than the short axis, and the long axis is formed to extend along the pull-out direction.

In the third process illustrated in FIG. 9(C), the connection part 64 of the caulking piece 52 and the connection recess part 54 of the iron core piece 53 are formed by the push-back processing, and the caulking piece 52 becomes in the state of being separably connected to the iron core piece 53 (strip material 57).

When viewed in the axial direction of the laminated iron core, the outer circumferential edge of the connection part 64 is processed to have the same shape as the inner circumferential edge of the connection recess part 54. The inner circumferential edge of the connection recess part 54 includes a pair of side portions extending in the radial direction and a bottom portion connecting the pair of side portions. When viewed in the axial direction of the laminated iron core, the bottom portion is processed not to be configured by a single straight line.

In the third process, as illustrated in FIG. 9(C), preferably, the shoulder parts 23 and 24 are formed in the caulking piece 52.

Next, in the fourth process illustrated in FIG. 9(D), the end portions of the bridge piece part 58 are blanked to obtain two caulking pieces 52. Thereafter, the outer shape of the iron core piece 53 is blanked to obtain the iron core piece 53 where the caulking piece 52 is connected.

The plurality of obtained iron core pieces 53 are laminated, and the caulking block 50 is formed by mutually caulking the caulking pieces 52 adjacent in the lamination direction, to maintain a state that the iron core pieces 53 are connected mutually.

In the fifth process, the iron core pieces 53 connected through the caulking blocks 50 are arranged on the jig, and then the caulking blocks 50 are pulled in the radial direction to be detached from the iron core pieces 53. Subsequently, in the sixth process, the laminated iron core pieces 53 are fixed.

In the fifth process, the jig can be used when the caulking blocks 50 are detached from the laminated iron core pieces 53. For example, the jig can be configured by a placement table which supports the laminated iron core pieces 53, a positioning member which is provided in the placement table and positions the laminated iron core pieces 53 with reference to an outer diameter, and an upper die which presses the laminated iron core pieces 53 after positioning and pinches the same between the placement table.

In the sixth process, when the iron core piece 53 is fixed, filling a through part (a through part made of the through hole 56) of the laminated iron core with a resin can be performed in a state that the laminated iron core is placed on the jig. For example, in a state where the laminated iron core is pinched between the upper die and the placement table, the through part is filled with the resin. Otherwise, the connection recess parts 54 adjacent in the lamination direction may be mutually fixed by the resin. The adhesive or the welding other than the resin also can be used to mutually connect the iron core pieces. Further, any two or more of the resin, the adhesive, and the welding are can be used in combination.

Figure 10:
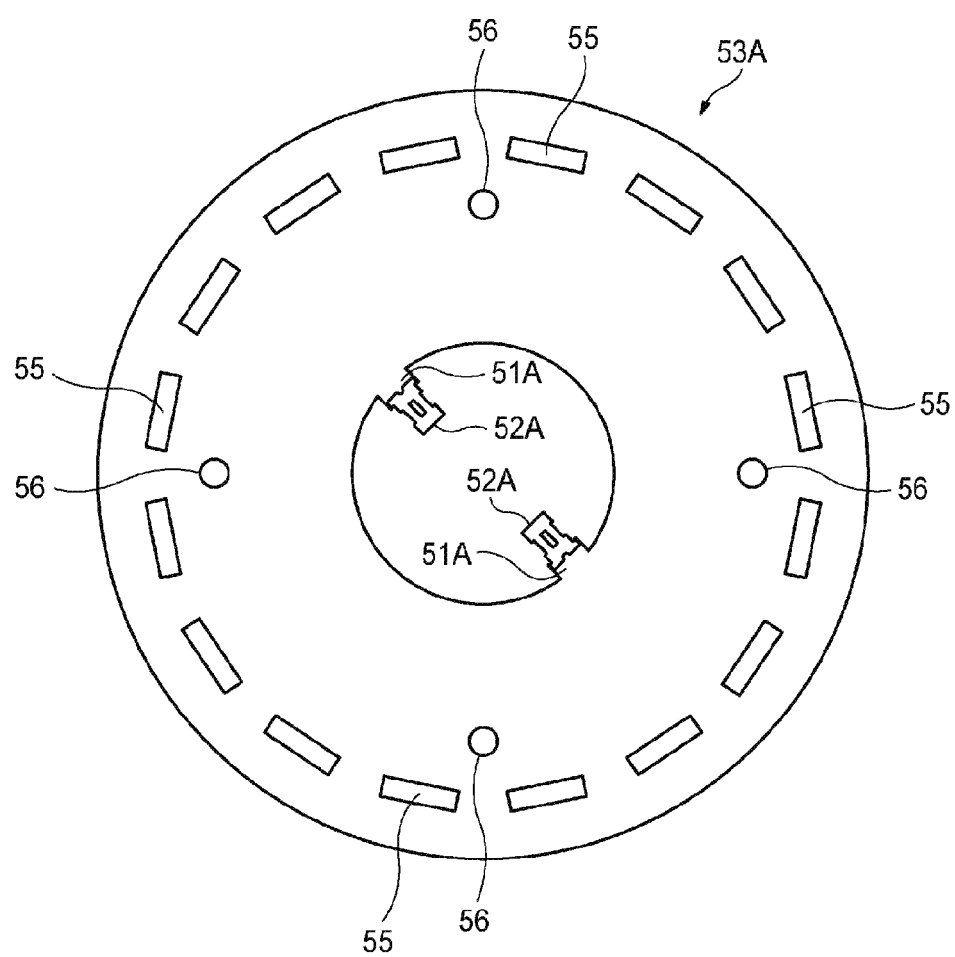
FIG. 10 is a plan view of an iron core piece according to the modified example.

In the method for manufacturing the laminated iron core according to the second embodiment of the present invention, the key piece part 51 and the caulking piece 52 are provided in different positions from each other. However, the present invention is not limited to the example. As illustrated in FIG. 10, a caulking piece 52A may be provided in an inner circumferential portion of a key piece part 61A.

Figure 11:
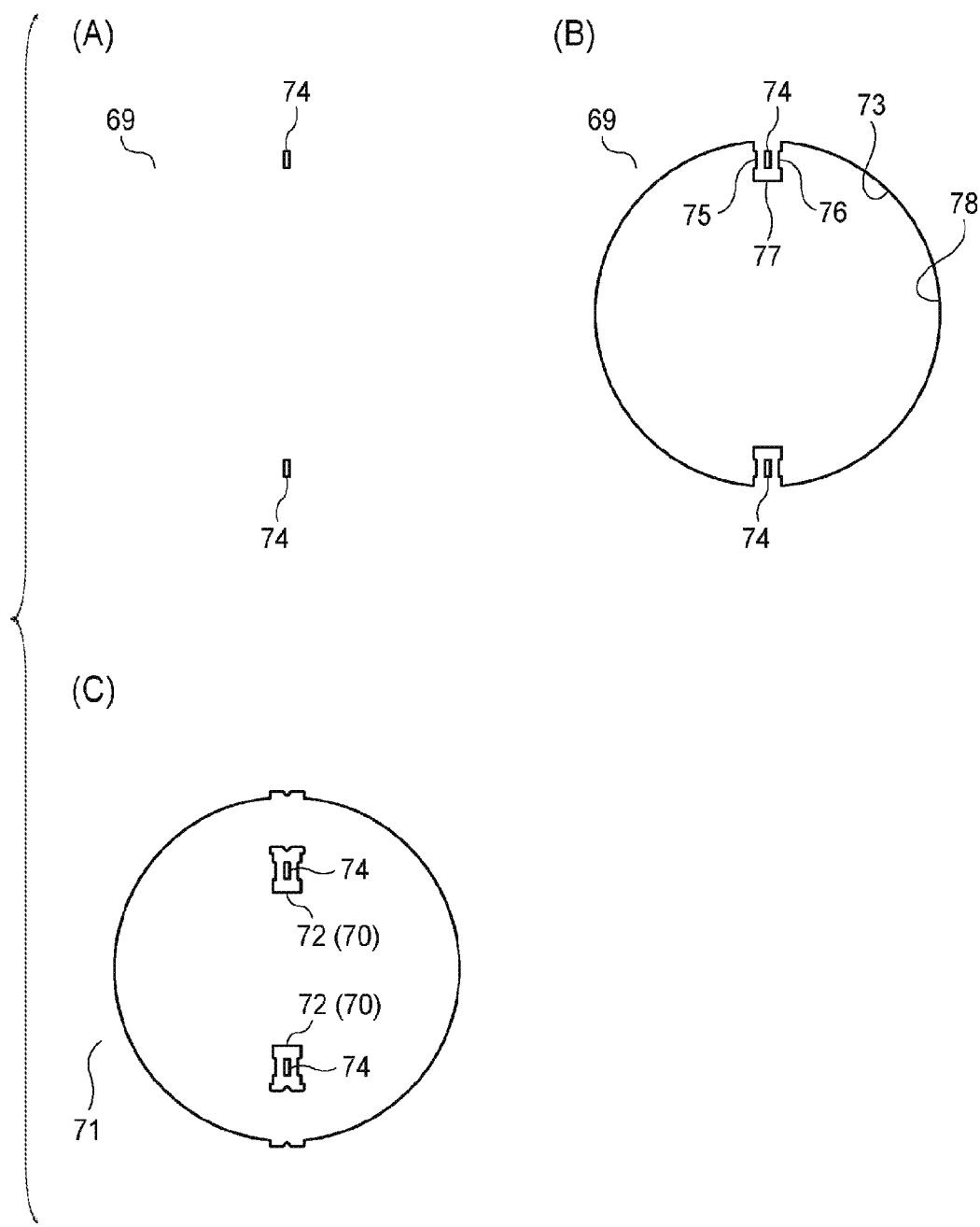
FIG. 11 includes diagrams for explaining a method for manufacturing a laminated iron core according to a third embodiment of the present invention.

Next, a method for manufacturing a laminated iron core according to a third embodiment of the present invention is described. In this embodiment, provided is a method for manufacturing a laminated iron core which is made of a rotor iron core. An iron core piece 71 connected with a caulking piece 72 is blanked by a die (not illustrated) from a strip material 69 made of an electromagnetic steel sheet having, for example, a thickness of 0.10 to 0.5 mm as illustrated in FIG. 11(A). The iron core pieces 71 are laminated, and the caulking block 70 is formed by mutually connecting the caulking pieces 72. The caulking blocks 70 are pulled to the inside in the radial direction so that the caulking blocks 70 are detached from the iron core pieces 71, and the laminated iron core pieces 71 are fixed mutually.

First, as illustrated in FIG. 11(A), a caulking processing part 74 is formed in the strip material 69 (first process). In the iron core piece 71 which is positioned in the lowest portion in the lamination direction, a caulking hole is formed as the caulking processing part 74 in the area where the caulking piece 72 is formed. In the iron core pieces 71 which are formed secondly or later in the lamination direction, a caulking protrusion is formed as the caulking processing part 74 in the area where the caulking piece 72 is formed.

Next, as illustrated in FIG. 11(B), the strip material 69 is blanked in an annular shape (second process) to leave the area where the caulking piece 72 is formed. Specifically, a lower hole 78 is blanked in the center of the iron core piece 71. The lower hole 78 includes contour lines 75 and 76 which oppositely protrude inward in the radial direction on both widthwise lateral sides of the caulking piece 72, a contour line 77 (which couples the tip portions of the contour lines 75 and 76) on the tip side of the caulking piece 72, and a part of the inner circumferential hole of the annular iron core piece 71. In the process, the outer circumferential edge of the iron core piece 71 is also blanked.

Figure 12:
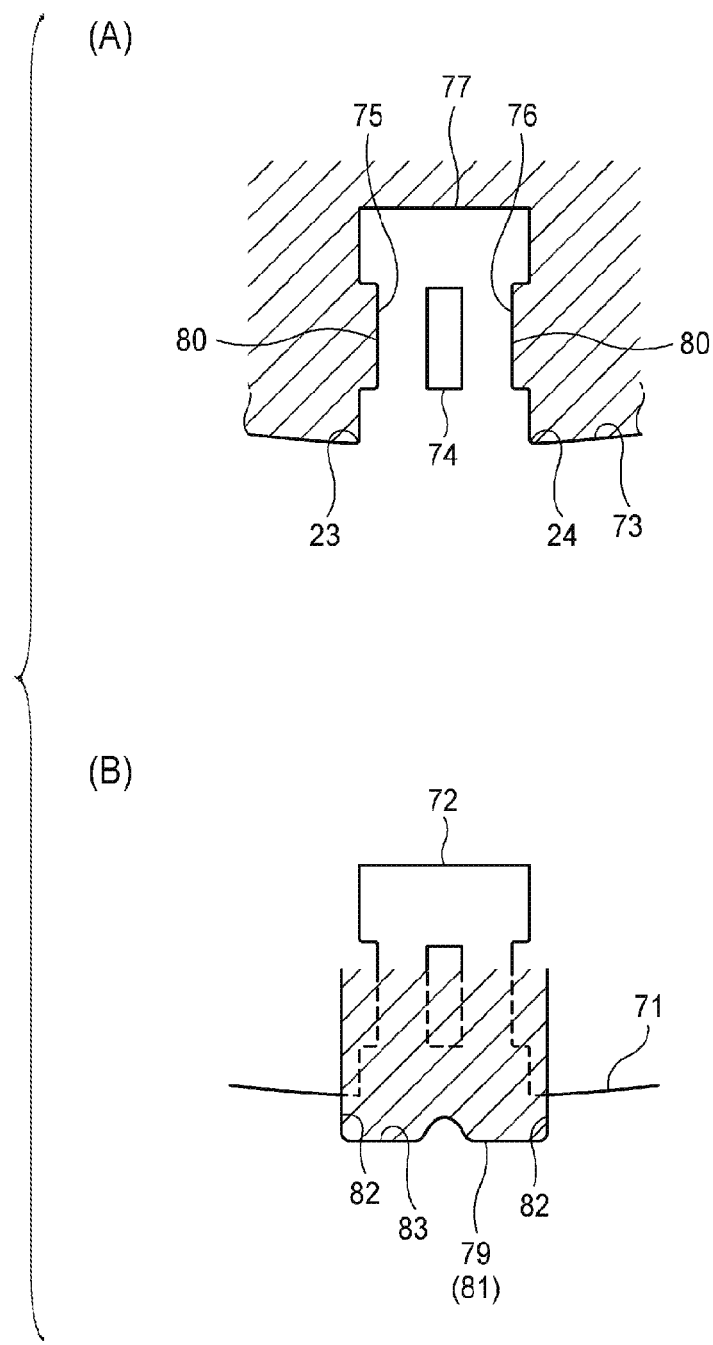
FIG. 12 includes diagrams for explaining a manufacturing process of a caulking piece in the method for manufacturing the laminated iron core according to the third embodiment of the present invention.

As illustrated in FIG. 12(A), in the second process, preferably, recess-shaped hooking parts 80 are formed when the contour lines 75 and 76 are processed. Preferably, the recess-shaped hooking part 80 which the jig can enter when pulling out is formed the side of the caulking piece 72 extending in the radial direction.

In addition, in the second process, preferably, the shoulder parts 23 and 24 are formed.

As illustrated in FIG. 12(B), the caulking piece 72 is separably connected with the iron core piece 71 (third process). By the push-back processing, a connection part 79 is formed in the caulking piece 72, and a connection recess part 81 is formed in the iron core piece 71. The push-back processing is performed by using the punch wider than the shoulder parts 23 and 24.

When viewed in the axial direction of the laminated iron core, the outer circumferential edge of the connection part 79 is processed to have the same shape as the inner circumferential edge of the connection recess part 81. The inner circumferential edge of the connection recess part 81 includes a pair of side portions 82 which extend in the radial direction and a bottom portion 83 which connects the pair of side portions 82. When viewed in the axial direction of the laminated iron core, the bottom portion 83 is processed not to be configured by a single straight line.

Next, as illustrated in FIG. 11(C), the plurality of iron core pieces 71 are laminated, and the caulking block 70 is formed by mutually caulking the caulking pieces 72 adjacent in the lamination direction. Next, the iron core pieces 71 connected by the caulking blocks 70 are mounted on the jig (not illustrated), and the caulking blocks 70 are pulled to the inner diameter side from the iron core pieces 71 to detach the caulking blocks 70 (fourth process). Further, the laminated iron core is obtained in such a manner that the through parts (not illustrated) of the iron core pieces 71 are filled with the resin, the connection recess parts 81 adjacent in the lamination direction are mutually coated with the resin or the adhesive, or the plurality of iron core pieces 71 are fixed (fixing) in the lamination direction by the welding.

In the method for manufacturing the laminated iron core according to the third embodiment of the present invention, the caulking processing part 74 is formed in the first process. However, the caulking processing part 74 can be formed in any processes before the outer shape of the iron core piece 71 is blanked. Preferably, the caulking processing part 74 has a flat shape having a short axis and a long axis longer than the short axis, and the long axis is formed to extend along the pull-out direction. The outer circumferential edge of the iron core piece 71 may be blanked between the third process and the fourth process.

Hereinbefore, the present invention has been described with reference to the embodiments. However, the present invention is not limited to the configuration described in the above-described embodiment, and also includes other embodiments and modifications contemplated within the scope of the matter described in the claims.

For example, a case where some or all of the embodiments or the modifications described above are combined to constitute the laminated iron core the present invention and the manufacturing method thereof of is also included in the scope of right of the present invention.

In the embodiment, a case has been described in which the laminated iron core of the present invention and the manufacturing method thereof are applied to the inner rotor type stator iron core where the rotor iron core is arranged with a gap inside the stator iron core. However, the present invention can be applied to an inner rotor type rotor iron core, and can be applied to an outer rotor type stator iron core or an outer rotor type rotor iron core in which the rotor iron core is arranged with a gap outside the stator iron core.

Further, in the embodiment, a case has been described in which the iron core pieces adjacent in the lamination direction are mutually connected after the caulking blocks are detached from the laminated iron core. However, first, the iron core pieces are connected mutually, and then the caulking blocks may be detached from the laminated iron core.

In the above-described embodiment, an example has been described in which the bottom portions of the outer circumferential edge (contour) of the connection part and the inner circumferential edge (contour) of the connection recess part are configured by two straight lines and a curved line which couples two straight lines. However, the present invention is not limited thereto.

When viewed in the axial direction of the laminated iron core, the bottom portion may be formed in a shape of FIG. 13(A) to (F).

Figure 13:
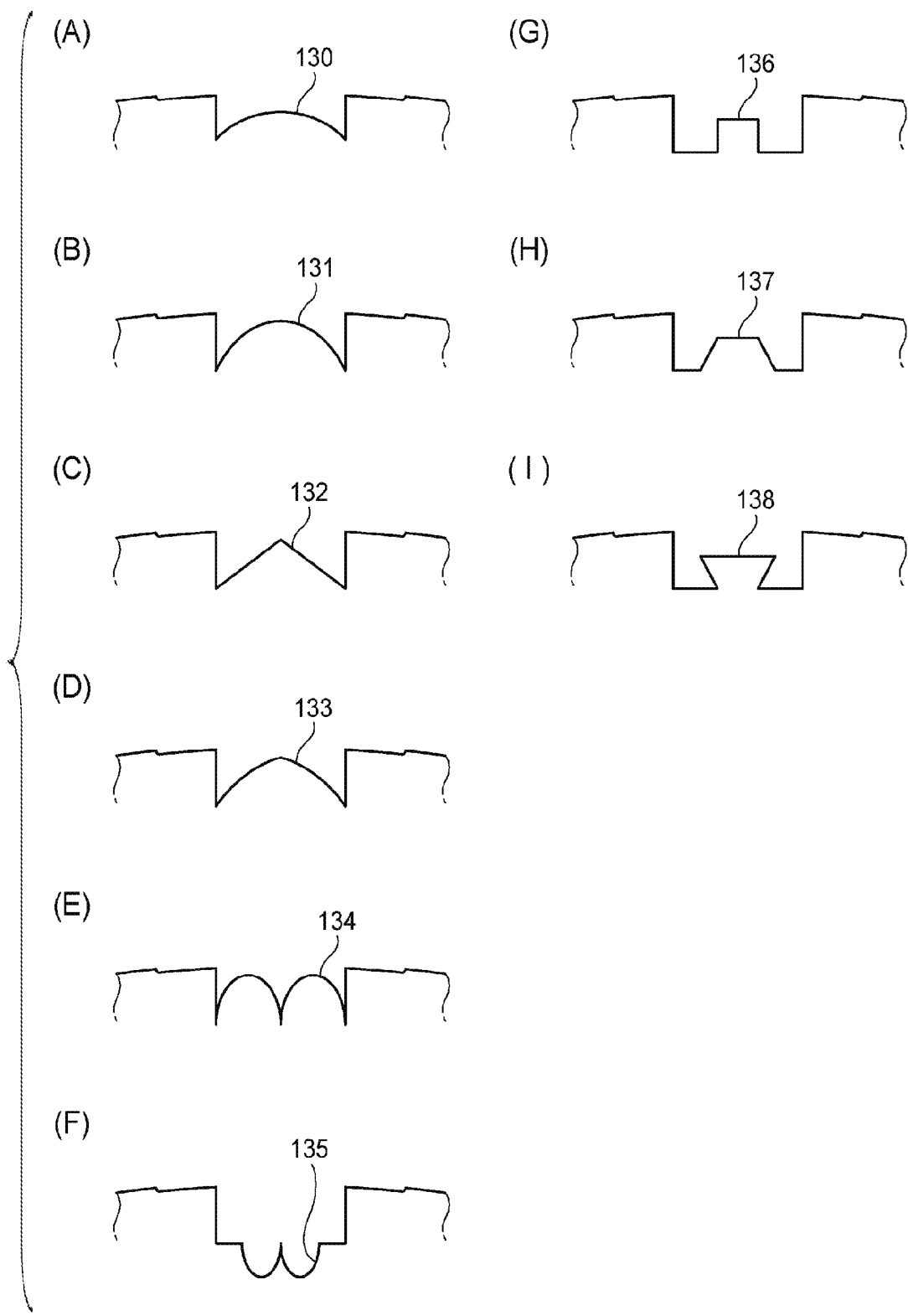
FIG. 13 includes plan views illustrating a connection recess part according to the modified example of the present invention.

As illustrated in FIG. 13(A), the contour of the bottom portion 130 may be configured as a single circular arc having a constant curvature.

As illustrated in FIG. 13(B), the contour of the bottom portion 131 may be configured by a single free-curved line, which does not have a constant curvature, such as an ellipse, a hyperbola, or a free-curved line. In the illustrated example, the bottom portion 131 is configured by a part of a single ellipse.

As illustrated in FIG. 13(C), the contour of the bottom portion 132 may be configured by a plurality of straight lines. In the illustrated example, the bottom portion 132 is configured by two straight lines, and the intersection point of two straight lines is positioned substantially in the center of the bottom portion 132.

As illustrated in FIG. 13(D), the contour of the bottom portion 133 may be configured by a plurality of circular arcs. In the illustrated example, the bottom portion 133 is configured by two circular arcs.

As illustrated in FIG. 13(E), the contour of the bottom portion 134 may be configured by a plurality of curved lines such as a plurality of ellipses, a plurality of hyperbolas, a plurality of free-curved lines, or a combination thereof. In the illustrated example, the bottom portion 134 is configured by a part of two ellipses.

As illustrated in FIG. 13(F), the contour of the bottom portion 135 may be configured by a combination of FIG. 13(A) to (E). In the illustrated example, the bottom portion 135 is configured by two straight lines and a part of two ellipses.

As illustrated in FIG. 13(G), the contour of the bottom portion may be configured to form a convex portion 136 having a rectangular shape. As illustrated in FIG. 13(H), the contour of the bottom portion may be configured to form a convex portion 137 having an isosceles trapezoidal shape in which the upper side is smaller than the lower side. Otherwise, as illustrated in FIG. 13(I), the contour of the bottom portion is configured to form a convex portion 138 having an isosceles trapezoidal shape in which the lower side is smaller than the upper side. In the contours of the bottom portion illustrated in FIG. 13(A) to (I), preferably, all the corner portions have shapes of FIGS. 13(F), (G), and (H) in which the outer portion (the portion of the caulking piece) of the bottom portion does not have an acute angle. The processing of the iron core piece and the caulking piece is facilitated.

Figure 14:
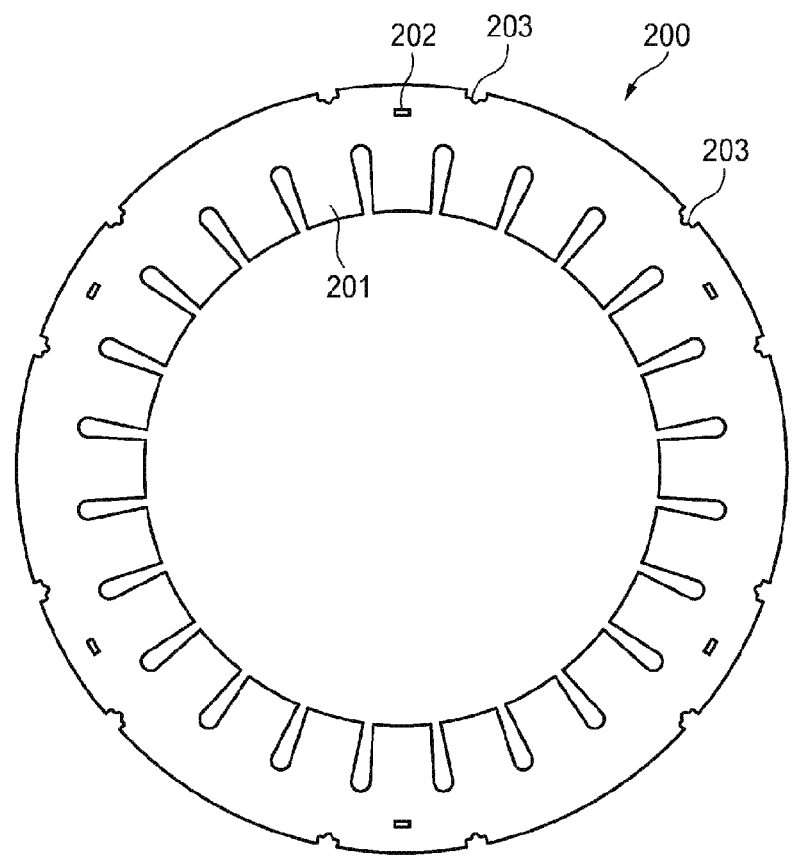
FIG. 14 is a plan view illustrating an iron core piece according to the modified example of the present invention.
Figure 15:
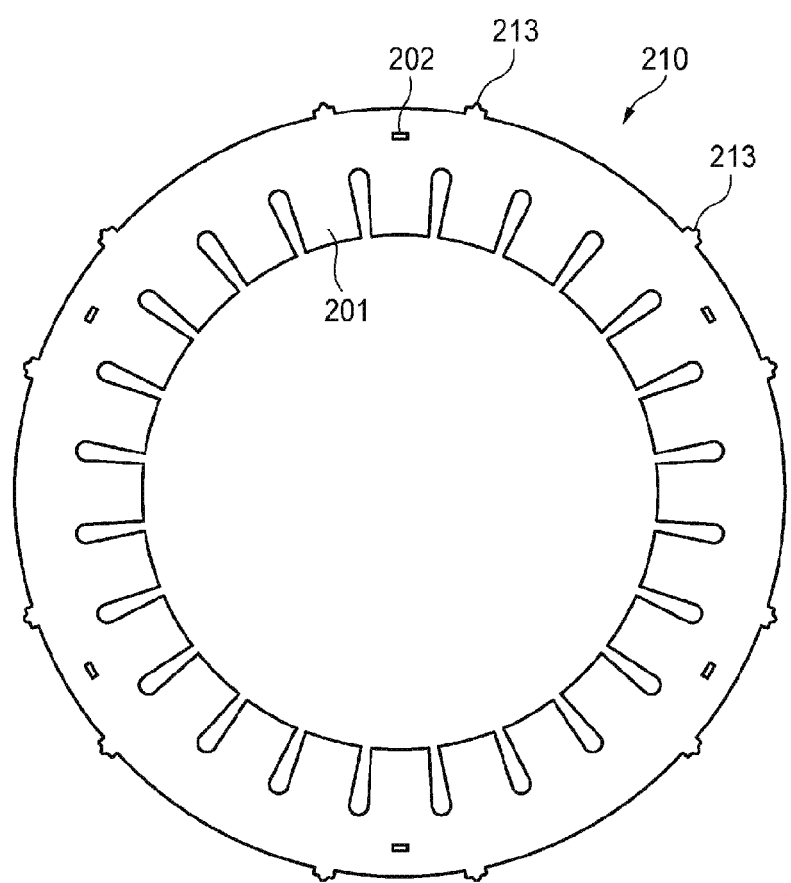
FIG. 15 is a plan view illustrating an iron core piece according to the modified example of the present invention.
Figure 16:
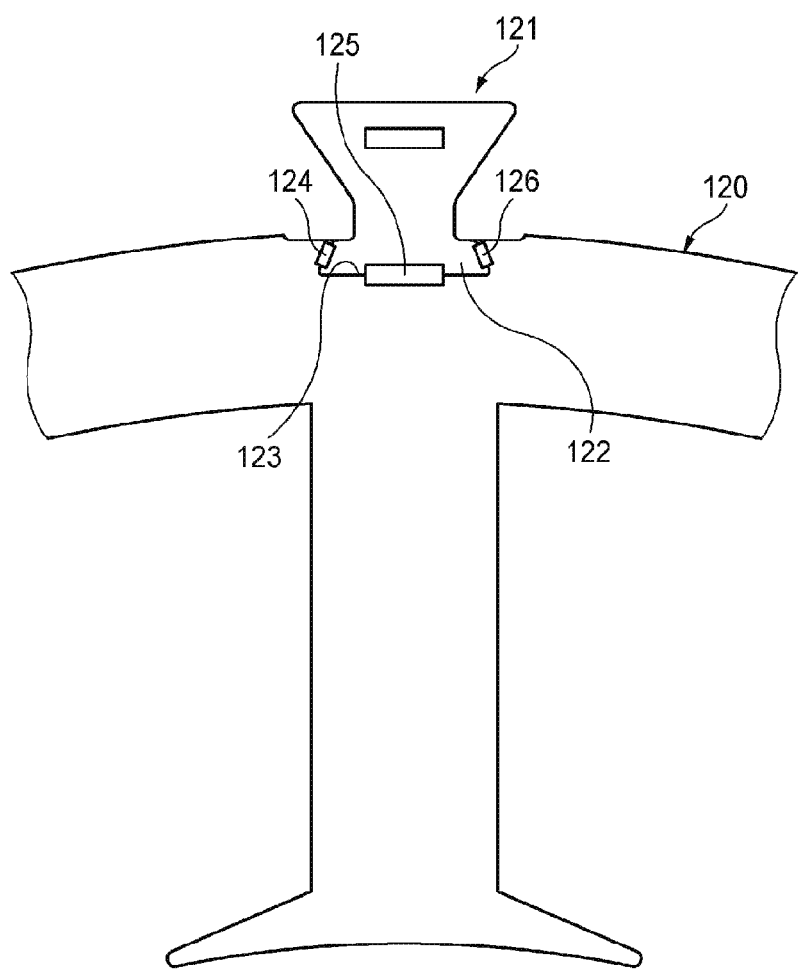
FIG. 16 is a plan view of an iron core piece according to a conventional example.

As illustrated in FIGS. 14 and 15, a shape may be applied in which a recess portion or a convex portion where the die grips the iron core pieces when the blanked iron core pieces are held in the die is not configured by a single straight line. In the example illustrated in FIGS. 14 and 15, the caulking block is not formed in the process of manufacturing the laminated iron core.

The laminated iron core can be obtained by using an iron core piece 200 illustrated in FIG. 14 as follows.

First, a lower hole is formed from a strip material by blanking. Further, a magnetic pole piece parts 201, a caulking part 202 for caulking the iron core pieces 200 adjacent in the lamination direction, and a recess portion 203 are formed in the vicinity of the lower hole. By the punch of the upper die and a die of the lower die, the outer shape of the iron core piece 200 is blanked, and the blanked iron core piece 200 is housed in the lower die. While the recess portion 203 is held by the lower die, the iron core pieces 210 are laminated, and the caulking parts 202 are caulked mutually, thereby obtaining the laminated iron core.

As illustrated in FIG. 14, all the recess portions 203 do not necessarily have the same shape. In the plurality of recess portions 203, at least one recess portion may have a shape in which the bottom portion thereof is not configured by a single straight line. In addition, as illustrated in FIG. 15, instead of the recess portion 203, a convex portion 213 may be provided in the outer circumferential portion of the iron core piece 210.

The present application is based on Japanese patent application No. 2016-091395 filed on Apr. 28, 2016, and the contents thereof are hereby incorporated by reference.

INDUSTRIAL APPLICABILITY

According to the present invention, there are provided a laminated iron core which can be economically manufactured with good workability even using an iron core piece provided with a caulking block, and a method for manufacturing same.

REFERENCE SIGNS LIST

10: laminated iron core
11: iron core piece
12: caulking block
13: yoke part
14: magnetic pole part
15: yoke piece part
16: magnetic pole piece part
17: through hole
18: resin
19: connection recess part
20: caulking piece
21: connection part
22: caulking processing part
23: shoulder part
24: shoulder part
25: outline
26: step
27: side portion
28: bottom portion
29: hooking part
30: curved line
31: straight line
32: straight line
33: strip material
34: first side area
35: second side area
36: outline
37: lateral side
38: outline
39: lateral side
42: line
43: line
44: conveyance jig
45: placement table
46: core member
50: caulking block
51: key piece part
52: caulking piece
53: iron core piece
54: connection recess part
56: through hole
57: strip material
58: bridge piece part
59: lower hole
60: lower hole
61: first side area
62: second side area
63: caulking processing part
64: connection part
69: strip material
70: caulking block
71: iron core piece
72: caulking piece
74: caulking processing part
75: contour line
76: contour line
77: contour line
78: lower hole
79: connection part
80: hooking part
81: connection recess part
82: side portion
83: bottom portion
120: iron core piece
121: caulking piece
122: wing-shaped portion
123: fitting recess part
124: recess part for separation
125: recess part for separation
126: recess part for separation
130: bottom portion
131: bottom portion
132: bottom portion
133: bottom portion
134: bottom portion
135: bottom portion
200: iron core piece
201: magnetic pole piece part
202: caulking part
203: recess portion
210: iron core piece
213: convex portion

The invention claimed is:

1. A laminated iron core formed by laminating a plurality of iron core pieces, wherein
at least one of an inner circumferential portion or an outer circumferential portion of each of the iron core pieces is provided with a connection recess part, wherein the connection recess part is connected with a connection part of each of a plurality of caulking pieces detachable in a radial direction from the connection recess part,
when viewed in an axial direction of the laminated iron core, an edge of the connection part is inserted into the connection recess part and has a shape that matingly connects with an opposing shape of an edge of the connection recess part,
the opposing shape of the edge of the connection recess part has a pair of side portions extending in the radial direction and a bottom portion, wherein the bottom portion connects the pair of side portions,
the bottom portion is not configured by a single straight line when viewed in the axial direction of the laminated iron core,
the pair of side portions are wider toward a detachment direction of the caulking pieces in the radial direction, and
the laminated iron core is configured such that a caulking block is detached from the laminated iron core, the caulking block being formed by laminating the plurality of caulking pieces.

2. The laminated iron core according to claim 1, wherein when viewed in the axial direction of the laminated iron core, the bottom portion is configured by any one of
a single circular arc,
a single curved line,
a plurality of straight lines,
a plurality of circular arcs,
a plurality of curved lines, and
a combination thereof.

3. The laminated iron core according to claim 1, wherein the connection part and the connection recess part include a cut mark in an axially intermediate portion.

4. A laminated iron core formed by laminating a plurality of iron core pieces, wherein
at least one of an inner circumferential portion or an outer circumferential portion of each of the iron core pieces is provided with a connection recess part, wherein the connection recess part is connected with a connection part of each of a plurality of caulking pieces detachable in a radial direction from the connection recess part, when viewed in an axial direction of the laminated iron core, an edge of the connection part is inserted into the connection recess part and has a shape that matingly connects with an opposing shape of an edge of the connection recess part, the opposing shape of the edge of the connection recess part has a pair of side portions extending in the radial direction and a bottom portion, wherein the bottom portion connects the pair of side portions, the bottom portion is not configured by a single straight line when viewed in the axial direction of the laminated iron core, the laminated iron core is configured such that a caulking block is detached from the laminated iron core, the caulking block being formed by laminating the plurality of caulking pieces, the bottom portion includes a friction part having at least one recess portion or convex portion, at least a part of the friction part is positioned in an intermediate portion of the bottom portion in a circumferential direction, and wherein the friction parts of the laminated iron core are mutually welded, the friction parts being laminated in a state where the caulking pieces are detached.

5. A method for manufacturing a laminated iron core, the method comprising:

a process of providing a connection recess part, wherein the connection recess part is connected with a connection part of each of a plurality of caulking pieces detachable in a radial direction from the connection recess part, in at least one of an inner circumferential portion and an outer circumferential portion of each of the iron core pieces;

a process of laminating the iron core pieces and forming a caulking block by mutually caulking the caulking pieces adjacent in a lamination direction, such that the iron core pieces are connected in the lamination direction;

a process of detaching the caulking block from the iron core pieces in the radial direction; and a process of fixing the laminated iron core pieces by any one or more of a resin, an adhesive and welding, wherein when viewed in an axial direction of the laminated iron core, an edge of the connection part is inserted into the connection recess part and has a shape that matingly connects with an opposing shape of an edge of the connection recess part, the opposing shape of the edge of the connection recess part includes a pair of side portions extending in the radial direction and a bottom portion connecting the pair of side portions, when viewed in the axial direction of the laminated iron core, the bottom portion is not configured by a single straight line, the pair of side portions are wider toward a detachment direction of the caulking pieces in the radial direction, and the laminated iron core is produced to detach a caulking block from the laminated iron core, the caulking block being formed by laminating the plurality of caulking pieces.

6. A method for manufacturing a laminated iron core, the method comprising:

a process of providing a connection recess part, wherein the connection recess part is connected with a connection part of each of a plurality of caulking pieces detachable in a radial direction from the connection recess part, in at least one of an inner circumferential portion and an outer circumferential portion of each of the iron core pieces;

a process of laminating the iron core pieces and forming a caulking block by mutually caulking the caulking pieces adjacent in a lamination direction, such that the iron core pieces are connected in the lamination direction;

a process of detaching the caulking block from the iron core pieces in the radial direction; and a process of fixing the laminated iron core pieces by any one or more of a resin, an adhesive and welding, wherein when viewed in an axial direction of the laminated iron core, an edge of the connection part is inserted into the connection recess part and has a shape that matingly connects with an opposing shape of an edge of the connection recess part, the opposing shape of the edge of the connection recess part includes a pair of side portions extending in the radial direction and a bottom portion connecting the pair of side portions, when viewed in the axial direction of the laminated iron core, the bottom portion is not configured by a single straight line, the laminated iron core is produced to detach a caulking block from the laminated iron core, the caulking block being formed by laminating the plurality of caulking pieces, and the connection parts of the laminated iron core pieces are mutually fixed by any one or more of a resin, an adhesive, and welding.

7. The method for manufacturing the laminated iron core according to claim 5, wherein after the connection part and the connection recess part are formed by a push-back processing and the caulking piece is separably connected with the iron core piece, the iron core pieces are laminated, the caulking block is formed by caulking the caulking pieces adjacent in the lamination direction, and a laminated state of the iron core pieces is maintained by the caulking block.

8. The method for manufacturing the laminated iron core according to claim 5, wherein when viewed in the axial direction of the laminated iron core, the bottom portion is configured by any one of
    a single circular arc,
    a single curved line,
    a plurality of straight lines,
    a plurality of circular arcs,
    a plurality of curved lines, and
    a combination thereof.

9. The method for manufacturing the laminated iron core according to claim 5, wherein the bottom portion includes a friction part having at least one recess portion or convex portion,
    at least a part of friction part is positioned in an intermediate portion of the bottom portion in a circumferential direction, and
    the laminated friction parts of the laminated iron core are mutually welded after the caulking block is detached from the laminated iron core.

10. The method for manufacturing the laminated iron core according to claim 5, wherein the process of detaching the caulking block from the iron core pieces in the radial direction includes
- placing the plurality of iron core pieces in a state of being connected through the caulking block in the lamination direction on a placement table having a notch provided right below the caulking block,
- detaching the caulking block from the iron core pieces in the radial direction, and
- dropping the detached caulking block to a lower side of the placement table through the notch.

* * * * *